United States Patent
Hwang et al.

(10) Patent No.: US 9,472,806 B2
(45) Date of Patent: *Oct. 18, 2016

(54) POLYMER, ELECTRODE FOR LITHIUM BATTERIES INCLUDING THE POLYMER, AND LITHIUM BATTERY INCLUDING THE ELECTRODE

(71) Applicant: Samsung Electronics Co., Ltd., Suwon-si, Gyeonggi-do (KR)

(72) Inventors: Seung-sik Hwang, Seongnam-si (KR); Jong-hwan Park, Yongin-si (KR); Jae-man Choi, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 137 days.

This patent is subject to a terminal disclaimer.

(21) Appl. No.: 14/230,284

(22) Filed: Mar. 31, 2014

(65) Prior Publication Data

US 2015/0076414 A1   Mar. 19, 2015

(30) Foreign Application Priority Data

Sep. 17, 2013 (KR) ........................ 10-2013-0112067

(51) Int. Cl.
| | |
|---|---|
| H01M 4/62 | (2006.01) |
| C08F 222/02 | (2006.01) |
| C08F 236/06 | (2006.01) |
| H01M 10/052 | (2010.01) |
| H01M 4/13 | (2010.01) |

(52) U.S. Cl.
CPC ............ *H01M 4/622* (2013.01); *C08F 222/02* (2013.01); *C08F 236/06* (2013.01); *H01M 4/13* (2013.01); *H01M 10/052* (2013.01)

(58) Field of Classification Search
CPC .... H01M 4/622; H01M 10/052; H01M 4/13; C08F 236/06; C08F 222/02
USPC .............................. 252/519.2, 500; 525/327.8
See application file for complete search history.

(56) References Cited

U.S. PATENT DOCUMENTS

| | | | | |
|---|---|---|---|---|
| 7,527,858 B2* | 5/2009 | Lundquist | ................... | C08J 5/04 428/337 |
| 7,744,772 B2* | 6/2010 | Gambut-Garel | ........ | C08L 83/06 252/62.2 |
| 7,875,388 B2* | 1/2011 | Le | ......................... | H01M 4/134 252/182.1 |
| 8,993,144 B2 | 3/2015 | Kwon et al. | | |
| 8,993,175 B2 | 3/2015 | Hwang et al. | | |
| 9,331,338 B2* | 5/2016 | Hwang | ................. | H01M 4/622 |
| 2005/0244715 A1* | 11/2005 | Cho | .................... | H01M 4/0402 429/246 |
| 2011/0311855 A1* | 12/2011 | Peng | .................. | H01M 2/1653 429/144 |
| 2012/0015236 A1* | 1/2012 | Spare | .................. | H01M 2/0275 429/162 |
| 2012/0100423 A1* | 4/2012 | Schubert | ............... | H01M 6/168 429/188 |
| 2012/0189895 A1* | 7/2012 | Gutsch | ................. | H01M 2/1673 429/144 |
| 2014/0079979 A1 | 3/2014 | Kwon et al. | | |
| 2014/0131630 A1* | 5/2014 | Hwang | ................. | H01M 4/622 252/519.2 |
| 2015/0076414 A1* | 3/2015 | Hwang | ................. | H01M 4/622 252/500 |
| 2015/0203722 A1* | 7/2015 | Yoshida | ................ | H01M 4/621 429/212 |

FOREIGN PATENT DOCUMENTS

| | | |
|---|---|---|
| JP | 5137990 A | 3/1976 |
| JP | 56060441 A | 5/1981 |
| JP | 2005149881 A | 6/2005 |
| JP | 2006351316 A | 12/2006 |
| JP | 4301923 B2 | 5/2009 |
| JP | 2010116475 A | 5/2010 |
| JP | 4657019 B2 | 1/2011 |
| JP | 2012018909 A | 1/2012 |
| KR | 1020070037686 A | 4/2007 |
| KR | 100857514 | 9/2008 |
| KR | 2013-0007306 A | 6/2011 |
| KR | 1020120007508 A | 1/2012 |
| KR | 2012-0090143 A | 8/2012 |
| KR | 1020120096461 A | 8/2012 |
| KR | 2013-0119207 A | 10/2013 |
| KR | 2014-0035689 A | 3/2014 |

OTHER PUBLICATIONS

Tetsuo Nakazawa et al., "Study on Organic Binder for CO2 Gas Hardening Rapid Molding Process", Imono, 60(5), 301-306 (1988).*

Athley, Robert "The Keys to Dispersing Corrosion Inhibitive Pigments for WB Coatings", Journal of Water Borne Coatings, Aug. 1982, 25-32.

(Continued)

*Primary Examiner* — Douglas McGinty
(74) *Attorney, Agent, or Firm* — Cantor Colburn LLP

(57) ABSTRACT

A polymer including a first repeating unit represented by Formula 1 and a second repeating unit including a substituted or unsubstituted C2-C30 alkenyl group:

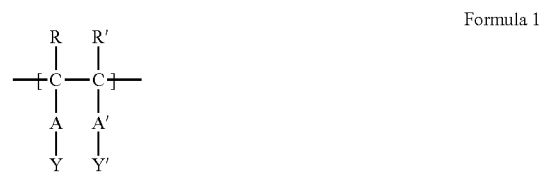

Formula 1 wherein, in Formula 1, groups R, R', A, A', Y, and Y' are defined in the specification.

20 Claims, 9 Drawing Sheets

(56) References Cited

OTHER PUBLICATIONS

Nakazawa, Tetsuo et al. "Study on Organic Binder for CO2 Gas Hardening Rapid Molding Process", Imono (1998), 60(5), 301-306.

Nicholson, John W. et al. "Thermal Behaviour of Partially Neutralised Ethylene-Maleic Acid Copolymer", British Polymer Journal, 21, (1989), 513-517.

* cited by examiner

POLYMER, ELECTRODE FOR LITHIUM BATTERIES INCLUDING THE POLYMER, AND LITHIUM BATTERY INCLUDING THE ELECTRODE

CROSS-REFERENCE TO RELATED APPLICATIONS

This application claims priority to Korean Patent Application No. 10-2013-0112067, filed on Sep. 17, 2013, in the Korean Intellectual Property Office, and all the benefits accruing therefrom under 35 U.S.C. §119, the disclosure of which is incorporated herein in its entirety by reference.

BACKGROUND

1. Field

The present disclosure relates to a polymer, an electrode for lithium batteries including the polymer, and a lithium battery including the electrode.

2. Description of the Related Art

Lithium batteries have high voltage and high energy density, and thus may be used in various applications. For example, for use in hybrid electric vehicles ("HEV"), plug-in hybrid electric vehicles ("PHEV"), and the like, the lithium batteries should be operable at high temperatures, be able to charge or discharge a large amount of electricity and have long-term usability.

To improve capacity and lifetime of a lithium battery, much research has been conducted to develop a novel binder for the lithium battery, in addition to novel positive electrode and negative electrode materials. However, there still remains a need in lithium batteries having high-discharge capacity and better lifetime characteristics.

SUMMARY

Provided are a novel polymer and an electrode for lithium batteries that includes the novel polymer.

Provided is a lithium battery with improved performance that includes the electrode.

Additional aspects will be set forth in part in the description which follows and, in part, will be apparent from the description, or may be learned by practice of the presented embodiments.

According to an aspect of the present disclosure, a polymer includes:
a first repeating unit represented by Formula 1 and
a second repeating unit including a substituted or unsubstituted C2-C30 alkenyl group:

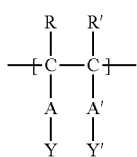

Formula 1 wherein, in Formula 1,

R and R' are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;

A and A' are each independently —C(=O)O—, —OS(=O)$_2$O—, —S(=O)$_2$O—, —S(=O)O—, —OP(=O)O$_2$—, or —P(=O)O$_2$—; and Y and Y' are each independently a hydrogen atom, an alkali metal, or an ammonium group, provided that Y and Y' are not both hydrogen atoms.

According to another aspect of the present disclosure, an electrode for a lithium battery includes:
at least one of the polymer of claim 1 and a cross-linking reaction product of the polymer; and
an electrode active material.

According to another aspect of the present disclosure, there is provided a polymer which is a reaction product of:
a polymer A including a first repeating unit represented by Formula 4c or 4d and
a second repeating unit including a substituted or unsubstituted C2-C30 alkenyl group; and
a base including an alkali metal or an ammonium group:

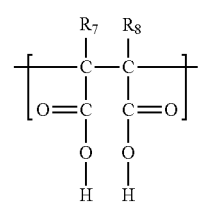

Formula 4c wherein, in Formula 4c,
R$_7$ and R$_8$ are each independently a hydrogen atom or a C1-C10 alkyl group.

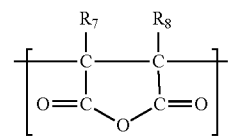

Formula 4d wherein, in Formula 4d,
R$_7$ and R$_8$ are each independently a hydrogen atom or a C1-C10 alkyl group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
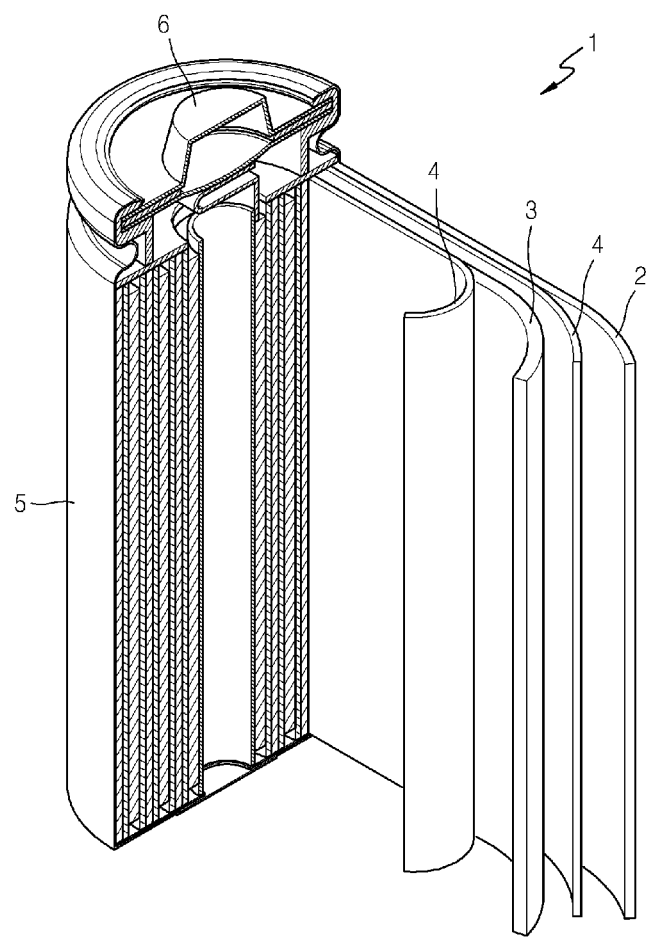
FIG. 1 is an exploded perspective view of a lithium battery according to an embodiment of the present disclosure.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, novel polymers according to embodiments of the present disclosure, electrodes for a lithium battery according to embodiments of the present disclosure, each including any of the novel polymers, and electrode batteries according to embodiments of the present disclosure, each including any of the electrodes, will be described in greater detail.

According to an embodiment of the present disclosure, a polymer includes
a first repeating unit represented by Formula 1 and
a second repeating unit including a substituted or unsubstituted C2-C30 alkenyl group.

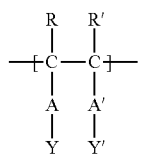

Formula 1

In Formula 1 above,

R and R' are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;

A and A' are each independently —C(=O)O—, —OS(=O)$_2$O—, —S(=O)$_2$O—, —S(=O)O—, —OP(=O)O$_2$—, or —P(=O)O$_2$—; and Y and Y' are each independently a hydrogen atom, an alkali metal, or an ammonium group, provided that Y and Y' may not both be hydrogen atoms.

The second repeating unit including the substituted or unsubstituted C2-C30 alkenyl group as the second repeating unit may be a C2-C30 olefin, a C2-C30 diene repeating unit, or a C2-C30 polyene repeating unit. Thus, the substituted or unsubstituted C2-C30 alkenyl group may include an aliphatic hydrocarbon having at least one unsaturated double bone.

At least one hydrogen atom in the "C2-C30 alkenyl group" may be substituted with a halogen atom, a C1-C30 alkyl group substituted with a halogen atom (for example, $CCF_3$, $CHCF_2$, $CH_2F$, $CCl_3$, and the like), a C1-C30 alkoxy group, a C2-C30 alkoxyalkyl group, a hydroxy group, a nitro group, a cyano group, an amino group, an amidino group, a hydrazine group, a hydrazone group, a carboxyl group or a salt thereof, a sulfonyl group, a sulfamoyl group, a sulfonyl acid group or a salt thereof, a phosphoric acid group or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C2-C30 heteroaryl group, a C3-C30 heteroarylalkyl group, a C2-C30 heteroaryloxy group, a C3-C30 heteroaryloxyalkyl group, or a C6-C30 heteroarylalkyloxy group.

In Formula 1, A and A' may be each independently a carboxylate group (—C(=O)O—), a sulfate group (—OS(=O)$_2$O—), a sulfite group (—S(=O)$_2$O—), a sulfinate group (—S(=O)O—), a phosphate group (—OP(=O)O$_2$—), or a phosphonate group (—P(=O)O$_2$—), as described above.

When A and A' are each independently a phosphate group or a phosphonate group, -A-Y may be selected from the functional groups represented by Structural Formula 1 below, and -A'-Y' may be selected from the functional groups represented by Structural Formula 2 below.

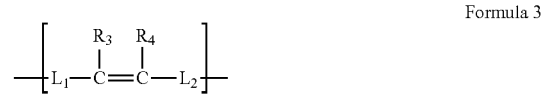

Structural Formula 1

Structural Formula 2

The first repeating unit of Formula 1 above may be a first repeating unit represented by Formula 2 below:

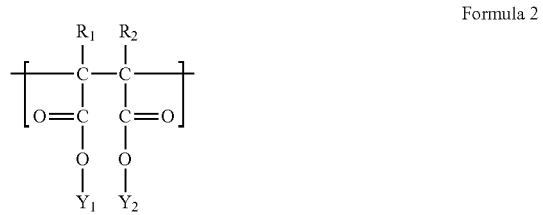

Formula 2

In Formula 2, $R_1$ and $R_2$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and $Y_1$ and $Y_2$ may be each independently a hydrogen atom, an alkali metal, or ammonium group, provided that $Y_1$ and $Y_2$ may not both be hydrogen atoms.

For example, the ammonium group may be —$NH_4$ or an ammonium group substituted with one to three substituents including at least one of a C1-C30 alkyl group, a C6-C30 aryl group, a C7-C30 arylalkyl group, a C1-C30 heteroaryl group, a C2-C30 heteroarylalkyl group, a C4-C30 carbocyclic group, and a C1-C30 heterocyclic group.

An example of the substituted or unsubstituted C2-C30 alkenylene group may be a repeating unit represented by Formula 3.

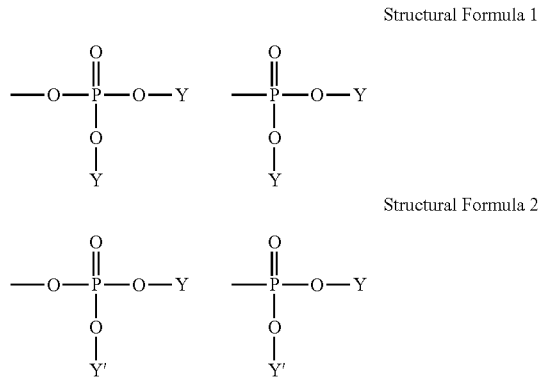

Formula 3

In Formula 3, $R_3$ and $R_4$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and $L_1$ and $L_2$ may be each independently a simple bond, a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C6-C30 aryloxy group, a substituted or unsubstituted C7-C30 arylalkylene group, a substituted or unsubstituted C2-C30 heteroarylene group, a substituted or unsubstituted C2-C30 heteroaryloxy group, a substituted or unsubstituted C3-C30 heteroarylalkylene group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkylene group.

For example, the substituted or unsubstituted C2-C30 alkenylene group may be butadiene, isoprene, ethylene, butylenes, 2-methyl-1,3-butadiene, 1,3-butadiene, 1,3,5-hexadiene, or the like.

In some embodiments, the polymer may further include a third repeating unit represented by Formula 4a or 4b.

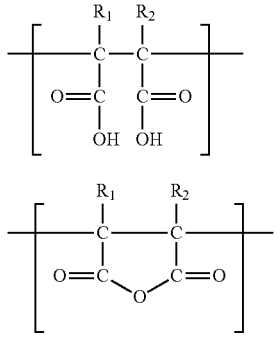

Formula 4a

Formula 4b

In Formulae 4a and 4b, $R_1$ and $R_2$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

Mole fractions of the first repeating unit according to an embodiment of the present disclosure, the second repeating unit according to an embodiment of the present disclosure, and the third repeating unit according to an embodiment of the present disclosure may be each independently from about 0.01 to about 0.99, for example, about 0.1 to about 0.9. The sum of the mole fractions of the first repeating unit and the second repeating unit may be about 1, and the sum of the mole fractions of the second repeating unit and the third repeating unit may be about 1. Also, the sum of the mole fractions of the first repeating unit, the second repeating unit, and the third repeating unit may be about 1.

In some embodiments, the polymer may include at least one of a first repeating unit represented by Formula 5, a second repeating unit represented by Formula 6, and a third repeating unit represented by Formula 4c or 4d:

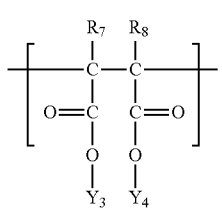

Formula 5 wherein, in Formula 5, $R_7$ and $R_8$ may be each independently a hydrogen atom or a C1-C10 alkyl group; and $Y_3$ and $Y_4$ may be each independently a hydrogen atom, Li, Na, K, or $NH_4$, provided that $Y_3$ and $Y_4$ may not both be hydrogen atoms,

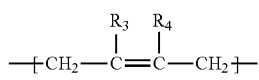

Formula 6 wherein, in Formula 6, $R_3$ and $R_4$ may be each independently a hydrogen atom or a C1-C10 alkyl group, and

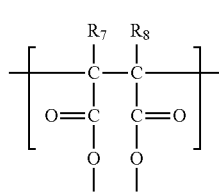

Formula 4c

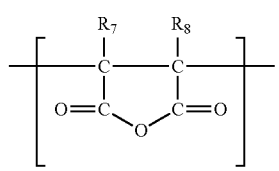

Formula 4d wherein, in Formulae 4c and 4d, $R_7$ and $R_8$ may be each independently a hydrogen atom or a C1-C10 alkyl group.

In some other embodiments, the polymer may have a degree of polymerization from about 50 to about 50,000, for example, from about 500 to about 50,000.

For example, mole fractions of the first repeating unit of Formula 5, the second repeating unit of Formula 6, and the third repeating unit of Formula 4c or 4d may be each independently from about 0.01 to about 0.99, for example, from about 0.1 to about 0.9. The sum of the mole fractions of the first repeating unit and the second repeating unit may be about 1, and the sum of the mole fractions of the second repeating unit and the third repeating unit may be about 1. Also, the sum of the mole fractions of the first repeating unit, the second repeating unit, and the third repeating unit may be about 1.

In some other embodiments, the polymer may include at least one of a first repeating unit represented by Formula 6a, a second repeating unit represented by Formula 7a, and a third repeating unit represented by Formula 4e.

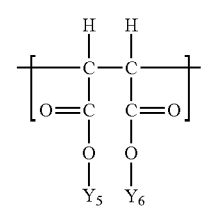

Formula 6a

In Formula 6a, $Y_5$ and $Y_6$ may be each independently a hydrogen atom, Li, Na, K, or $NH_4$, provided that $Y_5$ and $Y_6$ may not both be hydrogen atoms.

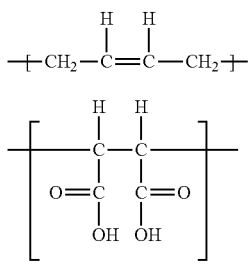

Formula 7a

Formula 4e

For example, the polymer may have a degree of polymerization from about 50 to about 50,000, for example, from about 500 to about 50,000.

For example, mole fractions of the first repeating unit of Formula 6a, the second repeating unit of Formula 7a, and the third repeating unit of Formula 4e may be each independently from about 0.01 to about 0.99, for example, from about 0.1 to about 0.9. The sum of the mole fractions of the first repeating unit of Formula 6a and the second repeating unit of Formula 7a may be about 1, and the sum of the mole fractions of the second repeating unit and the third repeating unit, may be about 1. Also, the sum of the mole fractions of the first repeating unit, the second repeating unit, and the third repeating unit may be about 1.

For example, the polymer may be a compound represented by Formula 8.

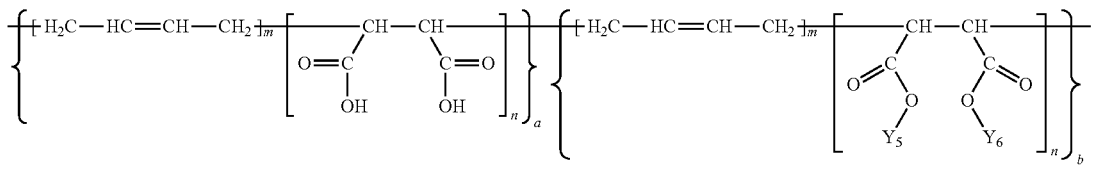

Formula 8

In Formula 8, i) $Y_5$ and $Y_6$ may be both lithium, or ii) one of $Y_5$ and $Y_6$ may be lithium and the other one of $Y_5$ and $Y_6$ may be a hydrogen atom;

a as a mole fraction may be 0 or from about 0.01 to about 0.99, and b as a mole fraction may be about 1 or from about 0.01 to about 0.99, wherein a+b=1; and m and n as mole fractions are each independently from about 0.01 to about 0.99, wherein m+n=1.

The polymer may have a degree of polymerization from about 50 to about 50,000, for example, from about 500 to about 50,000.

In some other embodiments, in Formula 8, a may be 0, b may be 1, and $Y_5$ and $Y_6$ may be both lithium.

According to another embodiment of the present disclosure, a polymer composition for a lithium battery includes a polymer as a reaction product between i) a polymer A including a first repeating unit represented by Formula 4c or 4d below and a second repeating unit including a substituted or unsubstituted C2-C30 alkenyl group, and ii) a base including an alkali metal or an ammonium group.

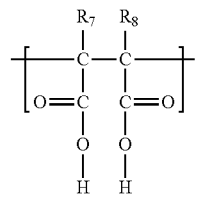

Formula 4c

In Formula 4c, $R_7$ and $R_8$ may be each independently a hydrogen atom or a C1-C10 alkyl group.

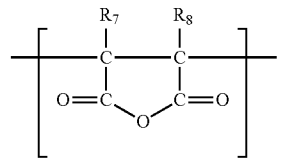

Formula 4d

In Formula 4d, $R_7$ and $R_8$ may be each independently a hydrogen atom or a C1-C10 alkyl group. A mole fraction of the first repeating unit of the polymer A may be from about 0.01 to about 0.99, for example, from about 0.1 to about 0.9, and a mole fraction of the second repeating unit of the polymer A may be from about 0.01 to about 0.99, for example, from about 0.1 to about 0.9. The sum of the mole fractions of the first repeating unit and the second repeating unit may be 1.

The second repeating unit of the polymer A may be a second repeating unit represented by Formula 6 below.

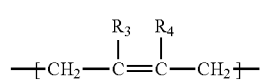

Formula 6

In Formula 6, $R_3$ and $R_4$ may be each independently a hydrogen atom or a C1-C10 alkyl group.-

According to another embodiment of the present disclosure, there is provided a polymer as a reaction product of i) the polymer A including a first repeating unit of Formula 4c or 4d above and a second repeating unit including a substituted or unsubstituted C2-C30 alkenyl group; and ii) a base including an alkali metal or an ammonium group. The polymer may have a degree of polymerization from about 50 to about 50,000, for example, from about 500 to about 50,000.

The reaction product may be obtained by mixing the polymer including the first repeating unit represented by Formula 4c or Formula 4d and the substituted or unsubstituted C2-C30 alkenyl group as the second repeating unit, the base including an alkali metal or an ammonium group, and water to obtain a mixture; and reacting the mixture at a temperature of from about 20° C. to about 100° C.

The base including an alkali metal or an ammonium group may be any base including an alkali metal or an ammonium group. For example, the base including an alkali metal or an ammonium group may be at least one selected from lithium hydroxide, sodium hydroxide, potassium hydroxide, and ammonium hydroxide, but is not limited thereto. An amount of the base including an alkali metal or an ammonium group may be from about 0.2 mole to about 2.0 mole, for example, from about 1.0 to about 2.0 mole, based on 1 mole of polymer A. When the amount of the base including an alkali metal or ammonium group is within this range, a polymer with an intended degree of substitution of the alkali metal or the ammonium group may be obtained.

A degree of substitution of an alkali metal or an ammonium group in the polymer may be from about 0.2 to about 1.0, in some embodiments, from about 0.4 to about 1.0, and in some other embodiments, from about 0.56 to about 1. An example of the alkali metal is lithium. An example of the base including an alkali metal or an ammonium group is lithium hydroxide.

In some embodiments, the polymer including the first repeating unit and the second repeating unit may have a weight average molecular weight of from about 10,000 Daltons ("Da") to about 500,000 Da, for example, from about 50,000 to about 500,000 Da, or for example, from about 100,000 to about 500,000 Da. When the weight average molecular weight of the polymer is within this range, the viscosity of the polymer composition may be appropriate to carry out the manufacturing process an electrode.

In some embodiments, the polymer, when analyzed by $^{13}$C-nuclear magnetic resonance ($^{13}$C-NMR) spectroscopy, may exhibit a carbon peak from —COOLi in a chemical shift range of about 180 parts per million ("ppm") to about 185 ppm. For example, a chemical shift of a maximum intensity peak of carbon may occur at about 180±5 ppm, for example, about 185 ppm, which indicates an upshift by about 3.0 ppm to about 5 ppm, from a maximum intensity peak of carbon from —COOH in a polymer, wherein a hydrogen atom in —COOH is not substituted by lithium. The term "upshift" refers to a chemical shift toward a larger ppm number.

The term "maximum intensity peak" indicates a peak in the center of a main peak with the maximum intensity.

In some embodiments, the polymer may be an alternating polymer, a random polymer, or a block polymer, depending on arrangement conditions of the first and second repeating units.

In some embodiments, an amount of lithium in the polymer may be from about 2 percent by weight ("wt %") to about 15 wt %, for example, from about 5 wt % to about 15 wt %, as analyzed by inductively coupled plasma ("ICP"). When the amount of lithium in the polymer is within this range, a lithium battery including the polymer may have improved lifetime and improved initial efficiency.

According to another embodiment of the present disclosure, there is provided a polymer composition obtained by adding water to any of the polymers according to the above-described embodiments. An amount of the water may be from about 400 parts to about 5,000 parts by weight, for example, from about 1,000 parts to about 5,000 parts by weight, based on 100 parts by weight of the polymer. When the amount of the water is within this range, the polymer may have improved solubility and a polymer composition including the polymer may have an appropriate viscosity to facilitate forming an electrode active material layer.

Particle size and surface area of electrode active materials are significant factors affecting battery characteristics. The smaller the particle size and the larger the surface area of the electrode active material, the better the performance of the battery, for example, in terms of its power output, capacity and discharge capacity at low temperatures and high rates. However, a smaller particle size and larger specific surface area of the electrode active material may lead to an increased contact area between the electrode active material and the electrolytic solution, so that a side reaction between the electrolytic solution and the electrode active material may more likely occur during initial lithium intercalation. This may result in an increased initial irreversible capacitance of the electrode active material, and consequently a low initial efficiency of the lithium battery. Thus there has been a need for further improvement in this regard.

A high initial efficiency of the lithium battery may lead to a higher actual capacity relative to a designed capacity, and consequently a higher energy density. In this regard, to increase the initial efficiency of a lithium battery, it may be desired to a design a battery in such a way as to prevent a direct contact between the electrode active material and the electrolytic solution.

In some embodiments, a polymer composition including a water-soluble polymer containing an alkali metal such as lithium, or an ammonium group, may be used as a binder. The polymer used as a binder may coat a surface of the electrode active material, thus efficiently blocking the electrode active material from contacting the electrolytic solution. Consequently, a side reaction between the electrode active material and the electrolytic solution may less likely occur, as compared to a battery, wherein a conventional water-soluble binder is used. Thus the initial efficiency of the lithium battery may be improved.

In the polymers according to the above embodiments, coordination of lithium ions with oxygen atoms of C(=O)O— results in a conducting path of the lithium ions.

In some embodiments, the polymer may have a degree of polymerization from about 50 to about 50,000, for example, from about 500 to about 50,000.

The formation of the conducting paths of lithium ions as described above may facilitate lithium substitution reaction by two-fold or greater, as compared with when using a lithium polyacrylate as a binder. Therefore, when an electrode active material layer is formed using the polymer composition as an electrode binder, an electrode with improved ion conductivity may be attainable.

Using any of the polymers according to the above-described embodiment as an electrode binder may be more effective when the polymer is used together with an electrode active material having a small particle diameter or a large specific surface area. That is, the polymer may cover the electrode active material to prevent defects thereof, thereby reducing a side reaction between the electrode active material and the electrolytic solution, and consequently increasing an initial efficiency.

Furthermore, when used as an electrode binder, the polymer may form an artificial solid electrolyte interface ("SEI") film on a surface of the electrode active material to cover defects of the electrode active material and block direct contact between the electrode active material and the electrolytic solution, thus suppressing side reactions and consequently improving an initial efficiency of the lithium battery.

In some embodiments, the polymer may be a polymer represented by Formula 8a or 8b below.

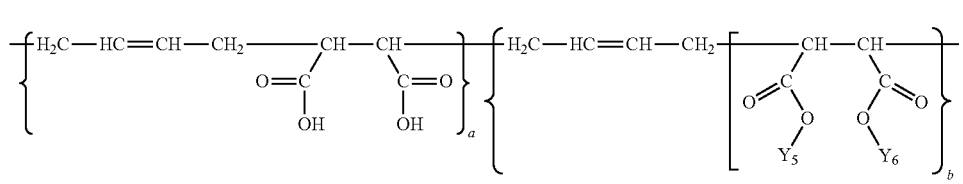
Formula 8a

In Formula 8a,
$Y_5$ and $Y_6$ may satisfy the following conditions:
i) $Y_5$ and $Y_6$ may be both lithium, or
ii) one of $Y_5$ and $Y_6$ may be lithium, and the other one of $Y_5$ and $Y_6$ may be a hydrogen atom; and
a as a mole fraction may be 0.25 and
b as a mole fraction may be 0.75.
In some embodiments, a and b may be 0.44 and 0.56, respectively.

Formula 8b

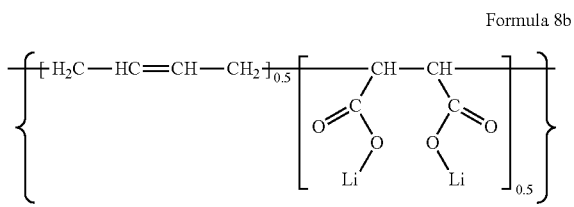

The polymer of Formula 8a may also be represented by Formula 8c below.

Formula 8c

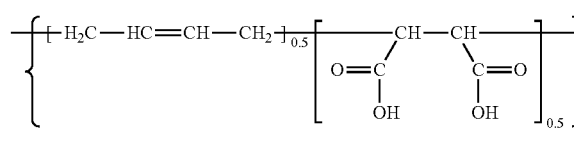

In Formula 8c, a and b, which indicate mole fractions, may be about 0.25 and about 0.75, respectively, or may be about 0.44 and about 0.56, respectively.
In Formulae 8b and 8c, the repeating units are found to have the same mole fraction of about 0.5. Accordingly, the mole fractions of the repeating units may be omitted in Formulae 8b and 8c.
Hereinafter, a method of preparing a polymer for a lithium secondary battery, according to an embodiment of the present disclosure, will be described in a greater detail. As an example, preparing a polymer represented by Formula 8 below will be described.

In Formula 8,
i) $Y_5$ and $Y_6$ may be both lithium, or
ii) one of $Y_5$ and $Y_6$ may be lithium, and the other one of $Y_5$ and $Y_6$ may be a hydrogen atom;
a as a mole fraction may be 0 or from 0.01 to 0.99, and
b as a mole fraction may be 1 or from 0.01 to 0.99, wherein a+b=1; and
m and n as mole fractions may be each independently from 0.01 to 0.99,
wherein m+n=1.
First, a polymer represented by Formula 9 below or a polymer represented by Formula 9a is mixed with a base including an alkali metal or an ammonium group and water to obtain a mixture.

Formula 9

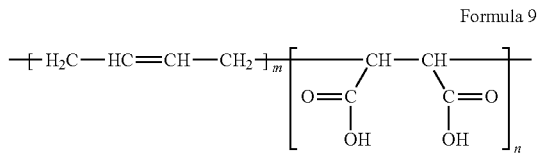

-continued

Formula 9a

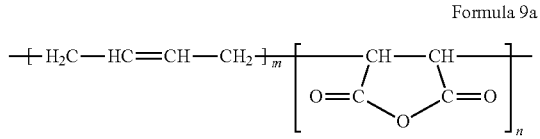

In Formulae 9 and 9a, m and n may be each independently from about 0.01 to about 0.99, for example, from about 0.1 to about 0.9.

Formula 8

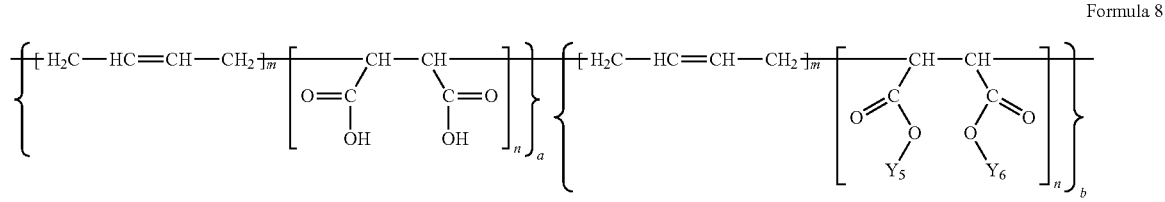

The polymer of Formula 9 and the polymer of Formula 9a may have a degree of polymerization from about 50 to about 50,000, for example, from about 500 to about 50,000.

The mixture is thermally treated at a temperature of from about 20° C. to about 100° C. to obtain a polymer composition including the polymer of Formula 8 above.

An amount of the water may be from about 400 parts to about 5,000 parts by weight, for example, from 1,000 to about 5,000 by weight, based on 100 parts by weight of the polymer. When the amount of the water is within this range, the polymer may have improved solubility characteristics, and a final polymer composition may have an appropriate viscosity to facilitate the formation of an electrode active material layer.

The type and amount of the base including an alkali metal or an ammonium group may directly affect a degree of substitution of the alkali metal or ammonium group, and for example, a degree of substitution of lithium, in the polymer of Formula 8.

The base including the alkali metal—may be at least one selected from lithium hydroxide, potassium hydroxide, sodium hydroxide, and the base including the ammonium group may be ammonium hydroxide.

An amount of the base including an alkali metal or an ammonium group may be from about 0.2 moles to about 2 moles, for example, from about 0.5 moles to about 2 moles, based on 1 mole of the polymer of Formula 9 or 9a. When the amount of the base including an alkali metal or an ammonium group is 1.0 mole based on 1 mole of the polymer of Formula 9 or 9a, a degree of substitution of the alkali metal or ammonium group (for example, lithium) in the final polymer product of Formula 8 may be 0.5 at a yield of 100%. As described above, a degree of substitution of the alkali metal or ammonium group (for example, lithium) may be determined based on the amount of the base including an alkali metal or an ammonium group used to prepare a polymer.

A degree of synthesis reaction progress for the polymer of Formula 8 may be identified by measuring a pH of a reaction mixture including the polymer of Formula 9 or 9a, the base including an alkali metal or an ammonium group, and water.

For example, a pH of the reaction mixture may be about 14 at an initial reaction stage, and may reach about 7.5 to 8.5 as the reaction progresses. Accordingly, when the pH of the reaction mixture is within this range, this may be regarded as the end point of the reaction.

In preparing a polymer composition from the polymer of Formula 9 or 9a, an amount of the water may be from about 400 parts to about 5,000 parts by weight, for example, from about 1,000 part to about 5,000 parts by weight, based on 100 parts by weight of the polymer of Formula 9 or 9a. When the amount of the water is within this range, the polymer composition may have an appropriate viscosity for coating.

The reaction temperature may be, for example, from about 20° C. to about 100° C. When the reaction temperature is within this range, it may be easy to control a desired degree of substitution of cations such as an alkali metal or ammonium group (for example, lithium).

The polymer of Formula 8 may be obtained through removing the water from the polymer composition. The removing of the water may be accomplished by thermally treating (drying) the polymer composition at a temperature of from about 80° C. to 100° C.

In some embodiments, when the base including an alkali metal or an ammonium group is lithium hydroxide, at least one of $Y_7$ and $Y_8$ in Formula 8 of the target polymer may be lithium.

In the polymer of Formula 8, a degree of lithium substitution may be from about 0.2 to about 1.0, in some embodiments, from about 0.4 to about 1.0, and in some other embodiments, from about 0.56 to about 1.0.

The term "degree of lithium substitution" is defined as follows.

For example, with the assumption that a polymer had a degree of polymerization "d", the polymer including a first repeating unit represented by Formula 1 above having two substitution sites for lithium, a total number of substitution sites for lithium is "2d". The term "degree of lithium substitution" refers to a ratio of the number of sites substantially substituted by lithium to the total number of substitutions sites for lithium (2d).

When the degree of lithium substitution is 1, it means that all of the substitution sites for lithium are substituted by lithium. For example, when the degree of lithium substitution is 0.56, it means that the number of the number of sites substantially substituted by lithium is equal to [2d×0.56].

The degree of lithium substitution may be appropriately adjusted to be a target range by control of a mixing ratio of starting materials. For example, a lithium-substituted polymer having a target degree of lithium substitution may be obtained by adjusting a mole ratio of the polymer including a first repeating unit of Formula 1 above and a substituted or unsubstituted C2-C30 alkenyl group as a second repeating unit to an amount of a lithium source (for example, lithium hydroxide).

The term "degree of substitution of an alkali metal or ammonium group" may also be defined like the term "degree of lithium substitution" above, except that lithium is replaced by an alkali metal or ammonium group.

According to another embodiment of the present disclosure, there is provided a cross-linked polymer as a product of cross-linking reaction of the polymer including a first repeating unit represented by Formula 1 above and a second repeating unit including the substituted or unsubstituted C2-C30 alkenyl group.

The second repeating unit including the substituted or unsubstituted C2-C30 alkenyl group as the second repeating unit may be a C2-C30 olefin, a C2-C30 diene repeating unit, or a C2-C30 polyene repeating unit. Thus, the substituted or unsubstituted C2-C30 alkenyl group may include an aliphatic hydrocarbon having at least one unsaturated double bone.

The cross-linked polymer may be obtained by thermally treating the polymer including a first repeating unit represented by Formula 1 above and a second repeating unit including a substituted or unsubstituted C2-C30 alkenyl group to result in cross-linking via alkenyl groups in the second repeating unit of the polymer.

According to another embodiment of the present disclosure, an electrode for a lithium secondary battery includes at least one of any of the polymers according to the above-described embodiments and a cross-linked polymer as a product of cross-linking reaction of the polymer.

The electrode may be manufactured by mixing an electrode active material and the polymer to prepare an electrode active material composition, and coating and drying the electrode active material composition on an electrode current collector to form the electrode having an electrode active material layer.

For example, an amount of the at least one of the polymer and the cross-linked product as a product of the cross-linking reaction of the polymer in the electrode may be from about 1 part to about 30 parts by weight, and in some embodiments, from about 2 parts to about 20 parts by weight, based on 100 parts by weight of the electrode active material. When the amount of the at least one of the polymer and the cross-linked product as a product of cross-linking reaction of the polymer is within this range, a lithium battery including the electrode may have improved initial efficiency, improved lifetime, and improved energy density.

The electrode may be, for example, a negative electrode.

The electrode may include a product resulting from the coating and drying of the mixture of the polymer composition and the electrode active material, and for example, may include a product including the polymer resulting from removing water from the polymer composition and the electrode active material.

The drying may be performed at a temperature from about 80° C. to about 300° C., for example, from about 150° C. to about 300° C.

The electrode may further include a cross-linked polymer as a product of cross-linking reaction of the polymer via the drying, in addition to the polymer.

In some embodiments, when used in a lithium battery, the electrode may further include, in addition to the polymer, a cross-linked polymer resulting from cross-linking reaction of the polymer during operation of the lithium battery.

In some other embodiments, the polymer may be used, in addition to as an electrode binder, as a separator or a coating material for a polymer electrolyte surface.

For example, any of the polymers according to the above-described embodiments may be used to prepare an electrode active material composition by being mixed with an electrode active material.

Examples of the electrode active material, and in particular, as a negative active material are a carbonaceous material, silicon, silicon oxide, a silicon-based alloy, a silicon-carbonaceous material composite, tin, a tin-based alloy, a tin-carbon composite, a metal oxide, or a combination thereof.

The carbonaceous material may include carbon black, graphite, acetylene black, carbon nanotubes, and the like.

The negative active material may be Si, $SiO_x$ (where $0<x<2$, for example, x is from 0.5 to 1.5), Sn, $SnO_2$, a silicon-containing metal alloy, or mixtures thereof. A metal alloyable with silicon to form a silicon alloy may be at least one selected from Al, Sn, Ag, Fe, Bi, Mg, Zn, In, Ge, Pb, and Ti.

The negative active material may include a metal/semi-metal alloyable with lithium, an alloy thereof, or an oxide thereof. Examples of the metal/semi-metal alloyable with lithium are Si, Sn, Al, Ge, Pb, Bi, Sb, a Si—Y alloy (where Y is an alkali metal, an alkali earth metal, a Group 13 element, a Group 14 element, a transition metal, a rare earth element, or a combination thereof except for Si), a Sn—Y alloy (where Y is an alkali metal, an alkali earth metal, a Group 13 element, a Group 14 element, a transition metal, a rare earth element, or a combination thereof except for Sn), and $MnO_x$ (where $0<x\leq2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/semi-metal alloyable with lithium are a lithium titanium oxide, a vanadium oxide, and a lithium vanadium oxide, $SnO_2$, and $SiO_x$ (where $0<x<2$).

For example, the negative active material may include at least one element selected from the elements of Groups 13, 14, and 15 of the periodic table of elements.

In some other embodiments, the negative active material may include at least one element selected from Si, Ge, and Sn.

The negative active material may be a mixture or composite of a carbonaceous material with one selected from silicon, silicon oxide, and a silicon-containing metal alloy as listed above.

In some embodiments, the negative active material may have a simple particulate form, or may be a nanostructure having a nanosize. In some embodiments, the negative active material may have any of a variety of forms, for example, nanoparticles, nanowires, nanorods, nanotubes, or nanobelts.

In some embodiments, the negative active material may include graphite, a silicon nanowire/graphite composite, a Si-CNT composite, a nanosized manganese oxide ($MnO_x$, $0<x\leq2$).

The graphite may have an average particle diameter of from about 0.5 micrometers ("µm") to about 2 µm, and in some embodiments, about 1 µm. In some embodiments, the graphite may have a particle diameter ("D90") of from about 5 µm to about 7 µm, for example, about 6.5 µm. As used herein, "D90" represents a particle diameter corresponding to a 90% of all diameters with respect to the total amount (100%) in a cumulative curve of number-based particle size distribution.

The negative electrode may be manufactured as follows.

For example, the negative electrode may be manufactured by coating a current collector, for example, a copper foil, with a negative active material composition including a negative active material and the polymer composition as a binder.

The negative active material and the polymer composition may be mixed together to prepare the negative active material composition.

The polymer composition may contain water. The negative active material composition may include a conducting agent.

The negative active material composition may be coated on the current collector to manufacture the negative electrode.

In manufacturing the negative electrode, an amount of the polymer in the polymer composition may be from about 1 part to about 30 parts by weight, and in some embodiments, from about 2 parts to about 20 parts by weight, based on 100 parts by weight of a total amount of the negative active material composition.

The coating of the negative active material composition is not limited to a specific method, and may be performed by a method selected from screen printing, spray coating, coating using a doctor blade, Gravure coating, dip coating, silk screen, painting, and coating using a slot die.

In general, the current collector may be manufactured to have a thickness of about 3 µm to about 20 µm.

After being coated on the current collector and/or a substrate, the negative active material composition is dried at about 80° C. to about 120° C. (primary heating) to remove the solvent, and is then roll-pressed, followed by drying to obtain the negative electrode.

When the drying temperature in the primary heating for removing water used as the solvent from the electrode is within this range, generation of air bubbles on the electrode surface may be suppressed, so that an electrode with improved surface uniformity may be obtained. The drying may be performed in an atmospheric condition.

The primary heating may be followed by secondary heating in a vacuum. The secondary heating may be performed at a vacuum of from about $1\times10^{-4}$ torr to about $1\times10^{-6}$ torr at a temperature of from about 80° C. to about 300° C.

The negative active material composition may further include, in addition to a negative active material as listed above, a carbonaceous negative active material.

Examples of the carbonaceous negative active material are crystalline carbon, amorphous carbon, and mixtures thereof. Non-limiting examples of the crystalline carbon are graphite, such as natural graphite or artificial graphite that are in amorphous, plate, flake, spherical or fibrous form. Non-limiting examples of the amorphous carbon are soft carbon (carbon sintered at low temperatures), hard carbon, meso-phase pitch carbides, sintered corks, graphene, carbon black, fullerene soot, carbon nanotubes, and carbon fibers. Any appropriate material available in the art may be used.

Non-limiting examples of the conducting agent are acetylene black, ketjen black, natural graphite, artificial graphite, carbon black, carbon fiber, metal powder and metal fiber of, for example, copper, nickel, aluminum, or silver, polyphenylene derivatives, or mixtures of at least one thereof. Any conducting agent available in the art may be used.

The negative electrode may further include a common binder that is widely used in the art, in addition to the above-described binder. Non-limiting examples of the common binder are sodium-carboxymethylcellulose ("Na-CMC"), alginic acid derivatives, chitosan derivatives, polyvinylalcohol ("PVA"), polyacrylic acid ("PAA"), polysodiumacrylate ("Na-PAA"), polyvinylpyrrolidone ("PVP"), polyacrylamide, polyamideimide, a vinylidene fluoride/hexafluoropropylene copolymer ("P(VDF-HFP)"), polyvinylidenefluoride ("PVDF"), polyacrylonitrile ("PAN"), aqueous-dispersion type styrene-butadiene rubber ("SBR"), aqueous-dispersion type butadiene rubber ("BR"), a modified product thereof (for example, a fluorinated polymer or a polymer with a sulfone (—$SO_2$—) substituent in a main chain), or a copolymer thereof (for example, a random copolymer, a block copolymer, or an alternating polymer with other polymers).

The current collector is not particularly limited, and may be any material so long as it has a suitable conductivity without causing chemical changes in the manufactured secondary battery. Non-limiting examples of the current collector are copper, stainless steel, aluminum, nickel, titanium, sintered carbon, copper or stainless steel that is surface-treated with carbon, nickel, titanium or silver, and aluminum-cadmium alloys.

In addition, the current collector may be processed to have fine irregularities on a surface thereof so as to enhance adhesion of the current collector to the negative active material, and may be used in any of a variety of forms, including films, sheets, foils, nets, porous structures, foams, and non-woven fabrics.

When the electrode is a positive electrode, a compound (lithiated intercalation compound) which allows reversible intercalation and deintercalation of lithium may be used as a positive active material. The positive active material may include at least one selected from lithium cobalt oxide, lithium nickel cobalt manganese oxide, lithium nickel cobalt aluminum oxide, lithium iron phosphorous oxide, and lithium manganese oxide. The positive active material is not limited to these examples, and may be any positive active material available in the art.

For example, the positive active material may be at least one selected from lithium cobalt oxide ($LiCoO_2$); lithium nickel oxide ($LiNiO_2$); lithium manganese oxides, including $Li_{1+x}Mn_{2-x}O_4$ (where x is from 0 to 0.33), $LiMnO_3$, $LiMn_2O_3$, and $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxide ($V_2O_5$); lithium nickel oxide ($LiNi_{1-x}M_xO_2$, where M is Co, Mn, Al, Cu, Fe, Mg, B, or Ga; and x is from 0.01 to 0.3); lithium manganese oxides, including $LiMn_{2-x}M_xO_2$ (where M is Co, Ni, Fe, Cr, Zn, or Ta; and x is from 0.01 to 0.1) and $Li_2Mn_3MO_8$ (where M is Fe, Co, Ni, Cu, or Zn); lithium manganese oxide ($LiMn_2O_4$) with partial substitution of lithium by alkali earth metal ions; disulfide compound; and iron molybdenum oxide ($Fe_2(MoO_4)_3$).

For example, the positive active material may be a compound represented by one of the following formula: $Li_aA_{1-b}B_bD_2$ (where $0.90 \le a \le 1.8$, and $0 \le b \le 0.5$); $Li_aE_{1-b}B_bO_{2-c}D_c$ (where $0.90 \le a \le 1.8$, $0 \le b \le 0.5$, and $0 \le c \le 0.5$); $LiE_{2-b}B_bO_{4-c}D_c$ (where $0 \le b \le 0.5$, and $0 \le c \le 0.5$); $Li_aNi_{1-b-c}Co_bB_cD_\alpha$ (where $0.90 \le a \le 1.8$, $0 \le c \le 0.5$, $0 \le c \le 0.05$, and $0 < \alpha \le 2$); $Li_aNi_{1-b-c}CO_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}CO_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above,

A is selected from nickel (Ni), cobalt (Co), manganese (Mn), and combinations thereof;

B is selected from aluminum (Al), nickel (Ni), cobalt (Co), manganese (Mn), chromium (Cr), iron (Fe), magnesium (Mg), strontium (Sr), vanadium (V), a rare earth element, and combinations thereof;

D is selected from oxygen (O), fluorine (F), sulfur (S), phosphorus (P), and combinations thereof;

E is selected from cobalt (Co), manganese (Mn), and combinations thereof;

F is selected from fluorine (F), sulfur (S), phosphorus (P), and combinations thereof;

G is selected from aluminum (Al), chromium (Cr), manganese (Mn), iron (Fe), magnesium (Mg), lanthanum (La), cerium (Ce), strontium (Sr), vanadium (V), and combinations thereof;

Q is selected from titanium (Ti), molybdenum (Mo), manganese (Mn), and combinations thereof;

I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

The compounds listed above as positive active materials may have a surface coating layer (hereinafter, "coating layer"). Alternatively, a mixture of a compound without having a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any of the above-listed compounds including these elements, according to any appropriate method that does not adversely affect physical properties of the positive active material when a compound of the coating element is used. For example, the coating layer may be formed using spray-coating, dipping, or any other method known to one of ordinary skill in the art. Non-limiting examples of the positive active material are $LiNiO_2$, $LiCoO_2$, $LiMn_xO_{2x}$ (where x is 1 or 2), $LiNi_{1-x}Mn_xO_2$ (where $0 < x < 1$), $LiNi_{1-x-y}Co_xMn_yO_2$ (where $0 \le x \le 0.5$ and $0 \le y \le 0.5$), $LiFeO_2$, $V_2O_5$, TiS, and MoS.

As a binder for the positive electrode, the positive composition according to the above-described embodiments of the present inventive concept may be used. The binder strongly binds positive active material particles to each other and to a current collector. As typical examples, the binder may be at least one of polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), polyamideimide, acrylated SBR, epoxy resin, and nylon, but not limited thereto.

In preparing the positive active material composition, the same conducting agent as used in the negative active material composition may be used.

The positive active material, the binder, and the conducting agent may be mixed together to obtain a positive active material layer composition.

When the positive composition according to the one or more embodiments of the present inventive concept is used as a binder in forming the positive active material layer, a solvent may not be used.

When a common positive electrode binder is used in forming the positive active material layer, a solvent may be used. Non-limiting examples of the solvent are water and N-methylpyrrolidone ("NMP").

A positive electrode using the positive active material composition may be manufactured in the same manner as in the manufacture of the negative electrode, except that the positive active material, instead of the negative active material, is used.

The amounts of the positive active material, the conducting agent, and the solvent may be those levels that are generally used in the manufacture of lithium secondary batteries in the art. At least one of the conducting agent and the solvent may not be used according to the use and the structure of the lithium secondary battery. Any kind of various additives, for example, a dispersing agent, a thickening agent, or a filler, may be further used in the manufacture of the positive electrode if required.

According to another embodiment of the present inventive concept, a lithium secondary battery includes the above-described negative electrode, the positive electrode, a separator, and a lithium salt-containing non-aqueous electrolyte.

The separator may be disposed between the positive electrode and the negative electrode. The separator may be an insulating thin film having a high ion permeability and strong mechanical strength.

The separator may have a pore diameter of from about 0.01 μm to about 10 μm, for example, from about 0.1 μm to about 10 μm, and a thickness of from about 5 μm to about 20 μm, for example, from about 10 μm to about 20 μm. Examples of the separator are olefin-based polymers, such as polypropylene, and sheets or non-woven fabric made of glass fiber or polyethylene. When a solid electrolyte, for example, a polymer electrolyte, is used as the electrolyte, the solid electrolyte may also serve as the separator.

The separator may be a monolayer or a multilayer including at least two layers of olefin-based polymer, for example, polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing non-aqueous electrolyte may contain a non-aqueous electrolytic solution and a lithium salt.

The non-aqueous electrolyte may be a non-aqueous liquid electrolyte, an organic solid electrolyte, or an inorganic solid electrolyte.

Non-limiting examples of the non-aqueous liquid electrolyte are any of aprotic organic solvents such as N-methyl-2-pyrrolidone, propylene carbonate, ethylene carbonate ("EC"), butylene carbonate, dimethyl carbonate, diethyl carbonate ("DEC"), γ-butyrolactone, 1,2-dimethoxyethane, tetrahydrofuran ("THF"), 2-methyltetrahydrofuran, dimethylsulfoxide ("DMSO"), 1,3-dioxolane, formamide, dimethylformamide ("DMF"), acetonitrile, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and fluoroethylene carbonate ("FEC").

Non-limiting examples of the organic solid electrolyte are polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be any lithium salt that is soluble in the above-mentioned non-aqueous electrolyte. Non-limiting examples of the lithium salt are $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, and lithium tetrakisphenyl borate. To improve charge/discharge characteristics or flame-retardancy, the non-aqueous electrolyte may be further added with, for example, pyridine, triethylphosphite, triethanolamine, cyclic ether, ethylene diamine, n-glyme, hexamethylphosphoramide, nitrobenzene derivatives, sulfur, quinine imine dye, N-substituted oxazolidinone, N,N-substituted imidazoline, ethylene glycol dialkyl ether, an ammonium salt, pyrrole, 2-methoxy ethanol, and aluminum chloride. In some other embodiments, to provide incombustibility, a halogen-containing solvent, such as carbon tetrachloride, and ethylene trifluoride may be further used.

FIG. 1 is an exploded perspective view of a lithium battery 1 according to an embodiment of the present disclosure.

Referring to FIG. 1, the lithium battery 1 includes a positive electrode 3, a negative electrode 2, and a separator 4. The positive electrode 3, the negative electrode 2 and the separator 4 are wound or folded, and then sealed in a battery case 5. Then, the battery case 5 is filled with an organic electrolytic solution and sealed with a cap assembly 6, thereby completing the manufacture of the lithium battery 1. The battery case 5 may be a cylindrical type, a rectangular type, or a thin-film type. For example, the lithium battery 1 may be a thin-film type battery. The lithium battery 1 may be a lithium ion battery.

The lithium battery 1 may be a lithium ion battery having a charge voltage of about 4.3 volts ("V") or greater.

The separator 4 may be interposed between the positive electrode 3 and the negative electrode 2 to form a battery assembly. Alternatively, the battery assembly may be stacked in a bi-cell structure and impregnated with the electrolytic solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, electric vehicle, and the like.

The lithium battery 1 may have improved high rate characteristics and lifetime characteristics, and thus may be applicable in an electric vehicle ("EV"), for example, in a hybrid vehicle such as plug-in hybrid electric vehicle ("PHEV").

Substituents in the formulae above may be defined as follows.

As used herein, the term "alkyl" indicates a group derived from a completely saturated, branched or unbranched (or a straight or linear) hydrocarbon.

Non-limiting examples of the "alkyl" group are a methyl group, an ethyl group, an n-propyl group, an isopropyl group, an n-butyl group, an isobutyl group, a sec-butyl group, a t-butyl group, an isopentyl group, a neopentyl group, a n-hexyl group, a 3-methylhexyl group, a 2,2-dimethylpentyl group, a 2,3-dimethylpentyl group, and an n-heptyl group.

At least one hydrogen atom of the alkyl group may be substituted with a halogen atom, a C1-C30 alkyl group substituted with a halogen atom (for example, $CCF_3$, $CHCF_2$, $CH_2F$, $CCl_3$, and the like), a C1-C30 alkoxy group, a C2-C30 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C2-C30 heteroaryl group, a C3-C30 heteroarylalkyl group, a C2-C30 heteroaryloxy group, a C3-C30 heteroaryloxyalkyl group, or a C6-C30 heteroarylalkyloxy group.

As used herein, the term "halogen atom" indicates fluorine, bromine, chloride, iodine, and the like.

As used herein, the term "C1-C30 alkyl group substituted with a halogen atom" indicates a C1-C30 alkyl group substituted with at least one halogen atom. Non-limiting examples of the C1-C30 alkyl group substituted with a halogen atom are a monohaloalkyl group, a dihaloalkyl group, or a polyhaloalkyl group, including a perhaloalkyl group.

Monohaloalkyls indicate alkyl groups including one iodine, bromine, chloride or fluoride. Dihaloalkyls and polyhaloalkyls indicate alkyl groups including at least two identical or different halo atoms.

As used herein, the term "alkoxy" represents "alkyl-O—", wherein the term "alkyl" has the same as described above. Non-limiting examples of the alkoxy group include a methoxy group, an ethoxy group, a propoxy group, a 2-propoxy group, an n-butoxy group, a sec-butoxy group, a t-butoxy group, a pentyloxy group, a hexyloxy group, a cyclopropoxy group, and a cyclohexyloxy group. At least one hydrogen atom of the alkoxy group may be substituted with substituents that are the same as those recited above in conjunction with the alkyl group.

As used herein, the term "aryl" group, which is used alone or in combination, indicates an aromatic hydrocarbon containing at least one ring.

As used herein, the term "aryl" is construed as including a group with an aromatic ring fused to at least one cycloalkyl ring.

Non-limiting examples of the "aryl" group include a phenyl group, a naphthyl group, and a tetrahydronaphthyl group.

At least one hydrogen atom of the "aryl" group may be substituted with substituents that are the same as those recited above in conjunction with the alkyl group.

As used herein, the term "arylalkyl" indicates an alkyl group substituted with an aryl group. Examples of the "arylalkyl" group are benzyl, phenyl-$CH_2CH_2$—, and the like.

As used herein, the term "aryloxy" indicates "—O-aryl". An example of the aryloxy group is a phenoxy group. At least one hydrogen atom of the "aryloxy" group may be substituted with substituents that are the same as those recited above in conjunction with the alkyl group.

As used herein, the term "heteroaryl group" indicates a monocyclic or bicyclic organic compound including at least one heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring.

In the heteroaryl group, S or N may be present in various oxidized forms.

Non-limiting examples of the monocyclic heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl groups.

As used herein, the term "heteroaryl" indicates a heteroaromatic ring fused to at least one of an aryl group, a cycloaliphatic group, and a heterocyclic group.

Non-limiting examples of the bicyclic heteroaryl group are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]pyranyl, 5H-pyrido[2,3-d]-o-oxazinyl, 1H-pyrazolo[4,3-d]oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl groups.

At least one hydrogen atom of the "heteroaryl" group may be substituted with substituents that are the same as those recited above in conjunction with the alkyl group.

As used herein, the term "heteroarylalkyl" group indicates an alkyl group substituted with a heteroaryl group.

As used herein, the term "heteroaryloxy" indicates o-heteroaryl moiety. At least one hydrogen atom of the heteroaryloxy group may be substituted with substituents that are the same as those recited above in conjunction with the alkyl group.

As used herein, the term "carbocyclic" group indicates a saturated or partially unsaturated non-aromatic monocyclic, bicyclic or tricyclic hydrocarbon group.

Non-limiting examples of the monocyclic hydrocarbon group include a cyclopentyl group, a cyclopentenyl group, a cyclohexyl group, and a cyclohexenyl group.

Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl groups.

An example of the tricyclic hydrocarbon group is an adamantyl group.

At least one hydrogen atom of the "carbocyclic group" may be substituted with substituents that are the same as those recited above in conjunction with the alkyl group.

As used herein, the term "heterocyclic group" indicates a five- to ten-membered ring including a heteroatom such as N, S, P, or O. An example of the heterocyclic group is a pyridyl group. At least one hydrogen atom in the heterocyclic group may be substituted with substituents that are the same as those recited above in conjunction with the alkyl group.

As used herein, the term "sulfonyl" indicates R"—SO$_2$—, wherein R" is a hydrogen atom, alkyl, aryl, heteroaryl, aryl-alkyl, heteroaryl-alkyl, alkoxy, aryloxy, cycloalkyl, or a heterocyclic group.

As used herein, the term "sulfamoyl" group refers to H$_2$NS(O$_2$)—, alkyl-NHS(O$_2$)—, (alkyl)$_2$NS(O$_2$)-aryl-NHS (O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

As used herein, the term "amino group" indicates a group with a nitrogen atom covalently bonded to at least one carbon or hetero atom. The amino group may refer to, for example, —NH$_2$ and substituted moieties.

As used herein, the term "amino group" also refers to an "alkylamino group" with nitrogen bound to at least one additional alkyl group, and "arylamino" and "diarylamino" groups with at least one or two nitrogen atoms bound to a selected aryl group.

(butadiene-co-maleic acid) represented by Formula 8c and deionized water. An amount of the lithium-substituted poly (butadiene-alt-maleic acid) in the polymer composition was about 21 parts by weight based on 100 parts by weight of the lithium-substituted poly(butadiene-co-maleic acid)-containing polymer composition.

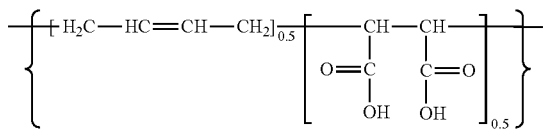

Formula 8e

The polymer composition was filtered, and then water-insoluble moieties were removed to obtain a filtered solid product, followed by removing water and drying at about 80° C. to obtain lithium-substituted poly(butadiene-co-maleic acid) represented by Formula 8c.

The lithium-substituted poly(butadiene-co-maleic acid) had a degree of lithium substitution of about 0.56.

Formula 8c $$\left\{\left[+H_2C-HC=CH-CH_2\right]_{0.5}\left[\begin{array}{c}CH-CH\\O=C\quad C=O\\|\quad\quad|\\OH\quad OH\end{array}\right]_{0.5}\right\}_a\left\{\left[+H_2C-HC=CH-CH_2\right]_{0.5}\left[\begin{array}{c}CH-CH\\C\quad\quad C\\O\quad O\quad O\quad O\\Li\quad\quad Li\end{array}\right]_{0.5}\right\}_b$$

As used herein, the term "aromatic" includes a cyclic hydrocarbon with alternating carbon and single bonds between carbon atoms.

As used herein, the term "heteroaromatic" includes an aromatic hydrocarbon wherein at least one of the carbon atoms is replaced with a heteroatom.

One or more embodiments will now be described in more detail with reference to the following examples. However, these examples are for illustrative purposes only and are not intended to limit the scope of the one or more embodiments.

In the following preparation examples, "co" in the term "poly((butadiene-co-maleic acid)" indicates a copolymer.

Preparation Example 1

Preparation of Composition Including Lithium-Substituted Poly(Butadiene-Co-Maleic Acid) (Degree of Lithium Substitution: 0.56) (Hereinafter, "Li-0.56-PBDMA") and Lithium-Substituted Poly(Butadiene-Co-Maleic Acid) (Degree of Lithium Substitution: 0.56) (Li—0.56-PBDMA)

10 g of poly(butadiene-co-maleic acid) (a mixing ratio of butadiene to maleic acid of 1:1 by mole, and a weight average molecular weight of about 10,000 to about 15,000) represented by Formula 8e and 1.61 g of LiOH were added to 37.62 g of deionized water, mixed together, and stirred at room temperature (about 25° C.) for about 24 hours to obtain a polymer composition including lithium-substituted poly In Formula 8c, a and b, which indicate mole fractions, were 0.44 and 0.56, respectively.

Preparation Example 2

Preparation of Composition Including Lithium-Substituted Poly(Butadiene-Co-Maleic Acid) (Degree of Lithium Substitution: 0.75) (Hereinafter, "Li-0.75-PBDMA")

A polymer composition lithium-substituted poly(butadiene-co-maleic acid) represented by Formula 8c and deionized water were obtained in the same manner of Example 1, except that the amount of LiOH was changed to 2.16 g.

An amount of the lithium-substituted poly(butadiene-co-maleic acid) in the polymer composition was about 21 parts by weight based on 100 parts by weight of the lithium-substituted poly(butadiene-co-maleic acid)-including composition.

The polymer composition was filtered, and then water-insoluble moieties were removed to obtain a filtered solid product, followed by removing water and drying at about 80° C. to obtain lithium-substituted poly(butadiene-co-maleic acid) represented by Formula 8c. The lithium-substituted poly(butadiene-co-maleic acid) had a degree of lithium substitution of about 0.75.

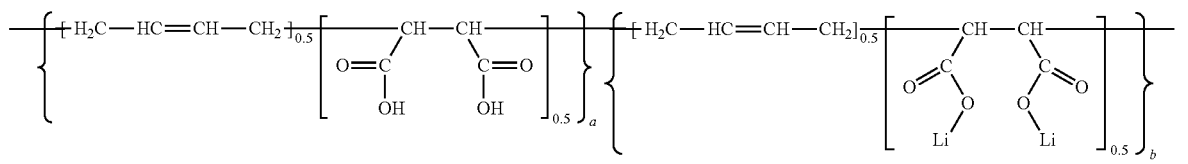

Formula 8c

In Formula 8c, a and b, which indicate mole fractions, were 0.25 and 0.75, respectively.

Preparation Example 3

Preparation of Composition Including Lithium-Substituted Poly(Butadiene-Co-Maleic Acid) (Degree of Lithium Substitution: 1.0) (Hereinafter, "Li-1.0-PBDMA")

A polymer composition including lithium-substituted poly(butadiene-co-maleic acid) represented by Formula 8b and deionized water was obtained in the same manner as in Example 1, except that the amount of LiOH was changed to 2.88 g. An amount of the lithium-substituted poly(butadiene-co-maleic acid) in the polymer composition was about 21 parts by weight based on 100 parts by weight of the lithium-substituted poly(butadiene-co-maleic acid)-including composition.

The polymer composition was filtered, and then water-insoluble moieties were removed to obtain a filtered solid product, followed by removing water and drying at about 80° C. to obtain lithium-substituted poly(butadiene-co-maleic acid) represented by Formula 8d. The lithium-substituted poly(butadiene-co-maleic acid) had a degree of lithium substitution of about 1.0.

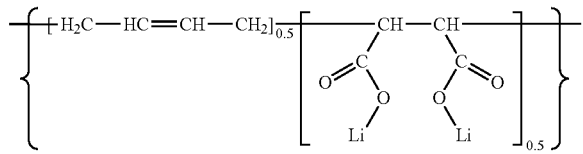

Formula 8b

Comparative Preparation Example 1

Preparation of Composition Including Poly(Butadiene-Co-Maleic Acid) (Degree of Lithium Substitution: 0) (Hereinafter, "PBDMA")

10 g of poly(butadiene-co-maleic acid) represented by Formula 8e (a mixing ratio of butadiene to maleic acid of about 1:1 by mole, and a weight average molecular weight of about 10,000 to about 15,000) was added to 37.62 g of deionized water and mixed together to obtain a polymer composition including poly(butadiene-co-maleic acid) and deionized water.

An amount of the poly(butadiene-co-maleic acid) in the polymer composition was about 21 parts by weight based on 100 parts by weight of the poly(isobutylene-co-maleic acid)-including composition.

The polymer composition was filtered, and then water-insoluble moieties were removed to obtain a filtered solid product, followed by removing water and drying at about 80° C. to obtain poly(butadiene-co-maleic acid).

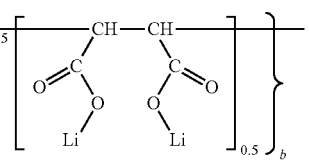

Formula 8e

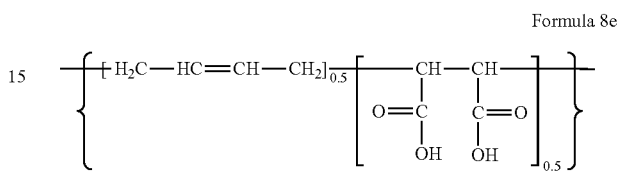

Example 1

Manufacture of Negative Electrode and Lithium Battery 88 parts by weight of a silicon nanowire/graphite composite as a negative active material, and 57.14 g of the lithium-substituted poly(butadiene-co-maleic acid)(degree of lithium substitution: 0.56)-containing composition of Preparation Example 1 as a binder were mixed to prepare a slurry. A mixed ratio of the solids, i.e., the negative active material to the lithium-substituted poly(butadiene-co-maleic acid) as the binder were about 88:12 by weight.

The slurry was coated on a copper current collector by using a doctor blade to a thickness of about 50 μm, dried in an oven at about 80° C. for about 2 hours, and then dried further in a vacuum at about 120° C. for about 2 hours, thereby manufacturing a negative electrode.

A coin cell was manufactured using the negative electrode, a lithium metal as a counter electrode, a polypropylene separator (Celgard 3510), and an electrolyte of 1.3 M LiPF$_6$ dissolved in a mixed solution of ethylene carbonate ("EC"), diethyl carbonate ("DEC"), and fluoroethylene carbonate ("FEC") in a volume ratio of about 2:6:2.

Examples 2-3

Manufacture of Negative Electrode and Lithium Battery

Coin cells were manufactured in the same manner as in Example 1, except that the lithium-substituted poly(butadiene-co-maleic acid) (degree of lithium substitution: 0.75)-including composition of Preparation Example 2, and the lithium-substituted poly(butadiene-co-maleic acid) (degree of lithium substitution: 1.0)-including composition of Preparation Example 3 were used as a binder, respectively, instead of the lithium-substituted poly(butadiene-co-maleic acid) (degree of lithium substitution: 0.56)-including composition of Preparation Example 1.

Comparative Example 1

Manufacture of Negative Electrode and Coin Cell

A negative electrode and a coin cell were manufactured in the same manner as in Example 1, except that the poly(butadiene-co-maleic acid)-including composition of Comparative Preparation Example 1, instead of the lithium-substituted poly(butadiene-co-maleic acid) (degree of lithium substitution: 0.56)-including composition of Preparation Example 1, was used.

Evaluation Example 1

NMR Analysis

1) $^{13}$C-NMR spectrum analysis

Figure 2:
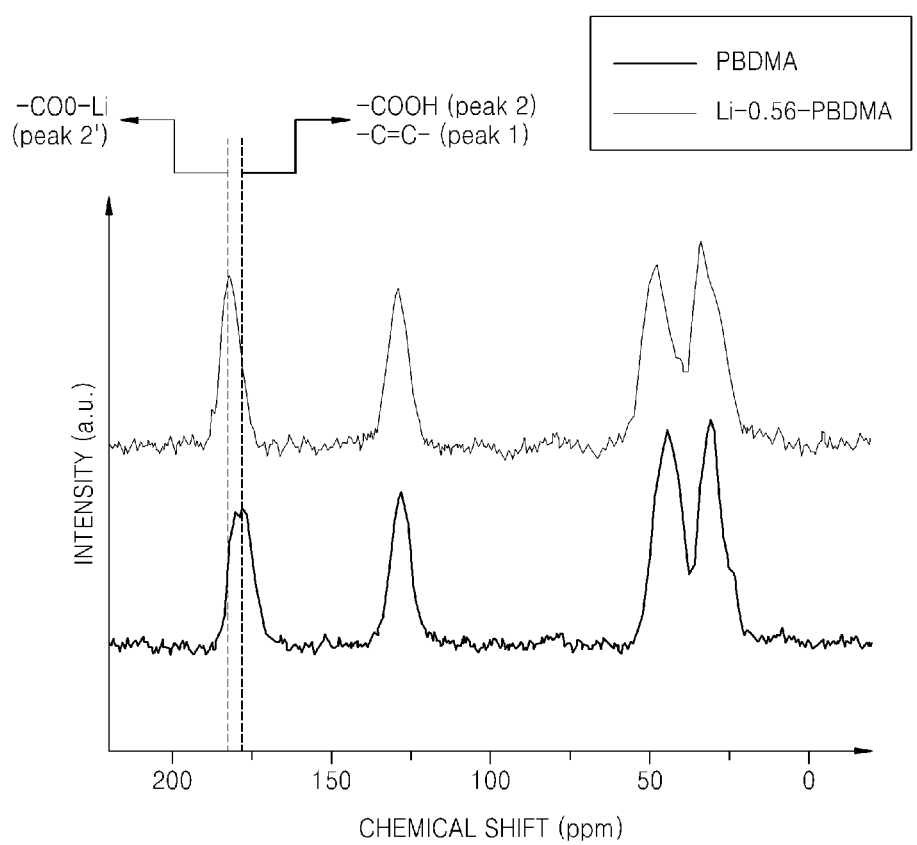
FIG. 2 is a graph of intensity (arbitrary unit, a.u.) versus chemical shift (parts per million, "ppm") Illustrating $^{13}$C-nuclear magnetic resonance ("NMR") spectra of a lithium-substituted poly(butadiene-co-maleic acid) (degree of lithium substitution: 0.56) in a composition prepared in Preparation Example 1 and poly(butadiene-co-maleic acid) prepared in Comparative Example 1.

The lithium-substituted poly(isobutylene-co-maleic acid) (degree of lithium substitution: 0.56) in the lithium-substituted poly(isobutylene-co-maleic acid)-including composition of Preparation Example 1, and the poly(butadiene-co-maleic acid) of Comparative Preparation Example 1 were analyzed by $^{13}$C-nuclear magnetic resonance ("NMR") spectroscopy through a sample preparation as described below. The results are shown in FIG. 2.

For the $^1$H-NMR spectroscopy of the lithium-substituted poly(butadiene-co-maleic acid), the lithium-substituted poly(butadiene-co-maleic acid)-containing composition of Preparation Example 1 was filtered, and water-insoluble moieties were removed to obtain a filtrate. Water was removed from the filtrate. The lithium-substituted poly(butadiene-co-maleic acid) was dissolved in $D_2O$ to prepare a sample for $^{13}$C-NMR spectroscopy, which was conducted using a NMR Spectrometer (300 MHz, DPX300, available from Bruker Co.).

A peak (Peak 1) from —C═C— in the poly(butadiene-co-maleic acid) of Comparative Preparation Example 1 and a peak (Peak 2) from —C(═O)OH were compared with a peak (Peak 1) from —C═C— in the lithium-substituted poly(butadiene-co-maleic acid) of Preparation Example 1 and a peak (Peak 2') from —C(═O)O—Li were compared with each other to obtain chemical shifts. The results are shown in Table 1.

TABLE 1

| Example | Peak | Area | Center | Width | Height | Area % |
|---|---|---|---|---|---|---|
| Comparative Preparation Example 1 (PBDMA) | 1 | 7409100000 | 128.5 | 6.34 | 744300000 | 48.6 |
| | 2 | 7821000000 | 178.6 | 6.94 | 717950000 | 51.4 |
| Preparation Example 1 (Li-0.56-PBDMA) | 1 | 8611000000 | 129.2 | 6.93 | 790500000 | 51.1 |
| | 2' | 8250700000 | 181.8 | 6.25 | 840650000 | 48.9 |

Referring to Table 1, in the lithium-substituted poly(butadiene-co-maleic acid) of Preparation Example 1, a peak shift occurred due to the conversion of —COOH group in the maleic anhydride repeating unit into —COO—Li via substitution of hydrogen (—H) in —COOH group by lithium (Li), and an integration peak ratio of —COO—Li to —C═C— was nearly 1:1, indicating that a mixing ratio of butadiene repeating unit to maleic acid repeating unit is 1:1.

2) $^1$H-Nuclear Magnetic Resonance ("NMR") Spectroscopic Analysis

The polymers of Preparation Examples 1 to 3 and the polymer of Comparative Preparation Example 1 were analyzed by $^1$H-NMR spectroscopy. The results are shown in FIGS. 6 to 9.

Figure 6:
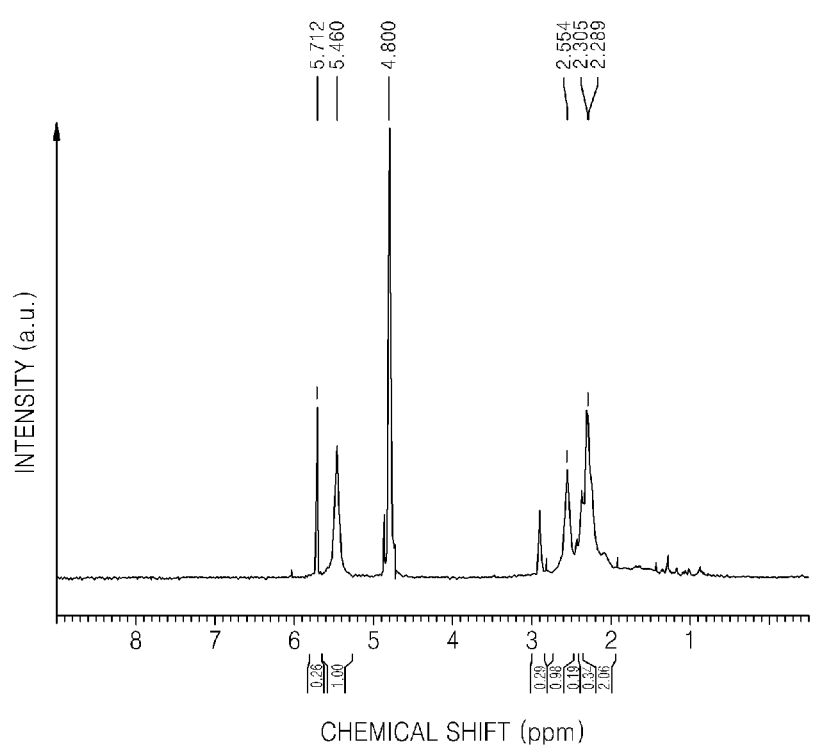
FIGS. 6 to 8 are graphs of intensity (arbitrary unit, a.u.) versus chemical shift (parts per million, "ppm") showing $^1$H-NMR spectra of the polymers of Preparation Examples 1 to 3.
Figure 7:
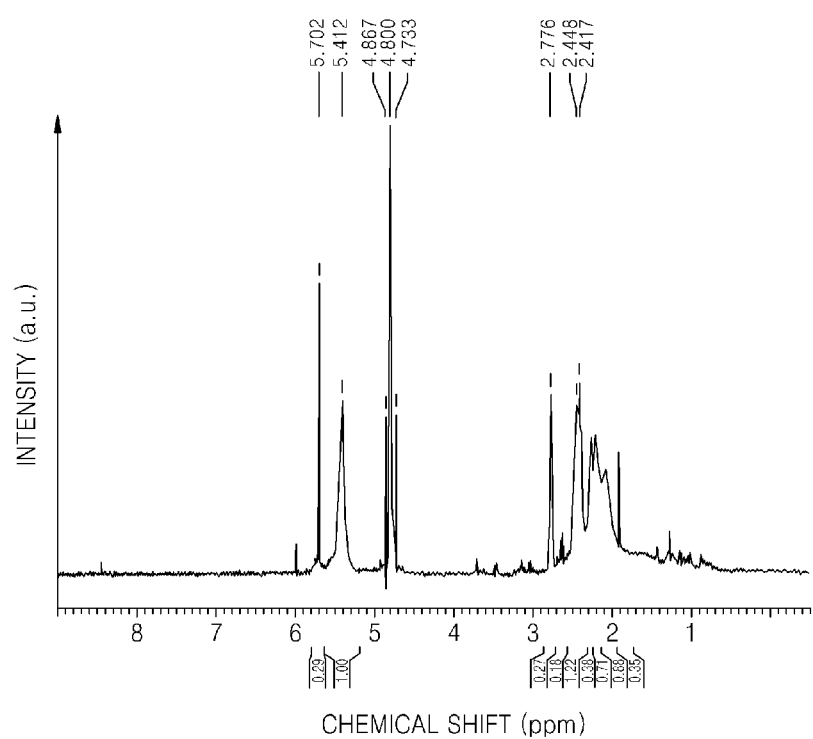
Figure 8:
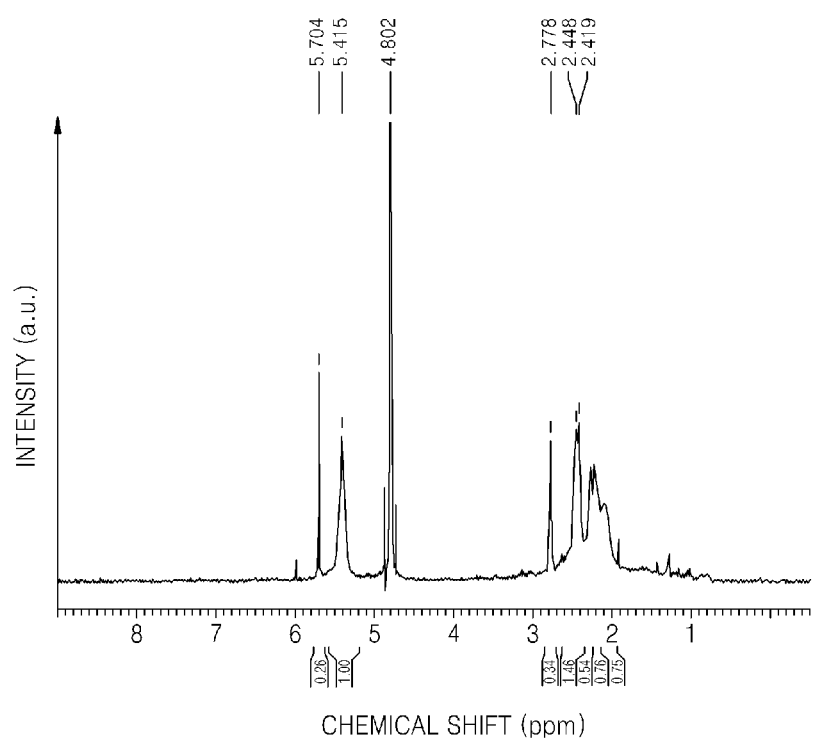

FIGS. 6 to 8 are $^1$H-NMR spectra of the polymers of Preparation Examples 1 to 3, respectively.

Figure 9:
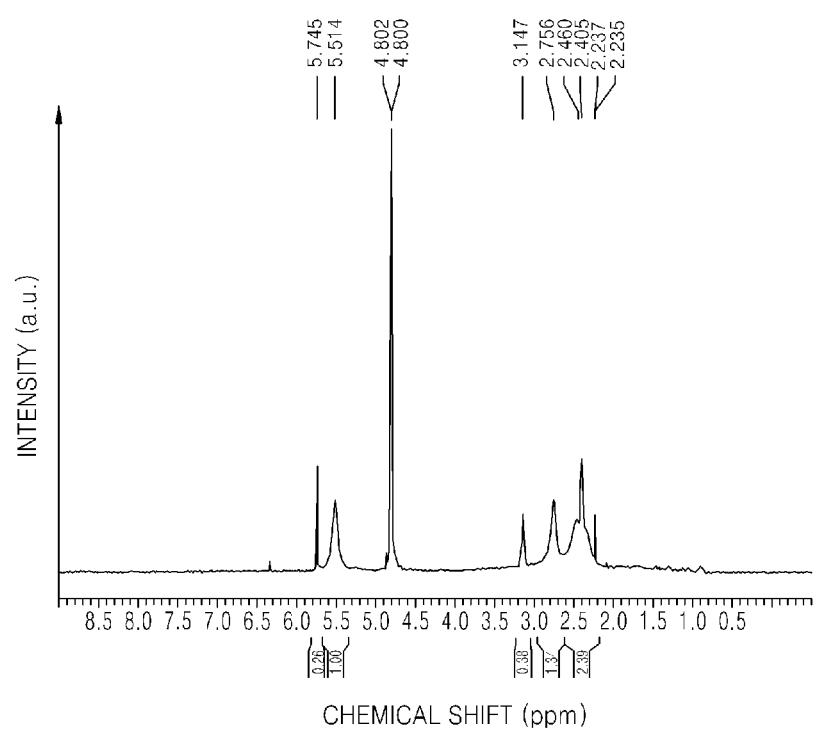
FIG. 9 is graphs of intensity (arbitrary unit, a.u.) versus chemical shift (parts per million, "ppm") showing a $^1$H-NMR spectrum of the polymer of Comparative Preparation Example 1.

FIG. 9 is a $^1$H-NMR spectrum of the polymer of Comparative Preparation Example 1.

Referring to FIGS. 6 to 8, in the polymers of Preparation Examples 1 to 3, a chemical shift from a peak at about 3.15 ppm to a peak in a range from about 2.9 ppm to about 2.8 ppm occurred, unlike in the polymer of Comparative Preparation Example 1. Based on this result, structures of the polymers of Preparation examples 1 to 3 were identified.

Evaluation Example 2

FT-IR Analysis

For Fourier-Transform Infrared ("FT-IR") spectroscopic analysis, samples were prepared in the same manner as in Evaluation Example 1 from the lithium-substituted poly(butadiene-co-maleic acid) (Li—0.56-PBDMA) of Preparation Example 1 (degree of lithium substitution: 0.56), the lithium-substituted poly(butadiene-co-maleic acid) (Li-0.75-PBDMA from Preparation Example 2 (degree of lithium substitution: 0.75), and poly(butadiene-co-maleic acid) of Comparative Preparation Example 1.

Each of the samples was analyzed using an FT-IR analyzer (VERTEX 70, available from Bruker). The results are shown in FIG. 3.

Figure 3:
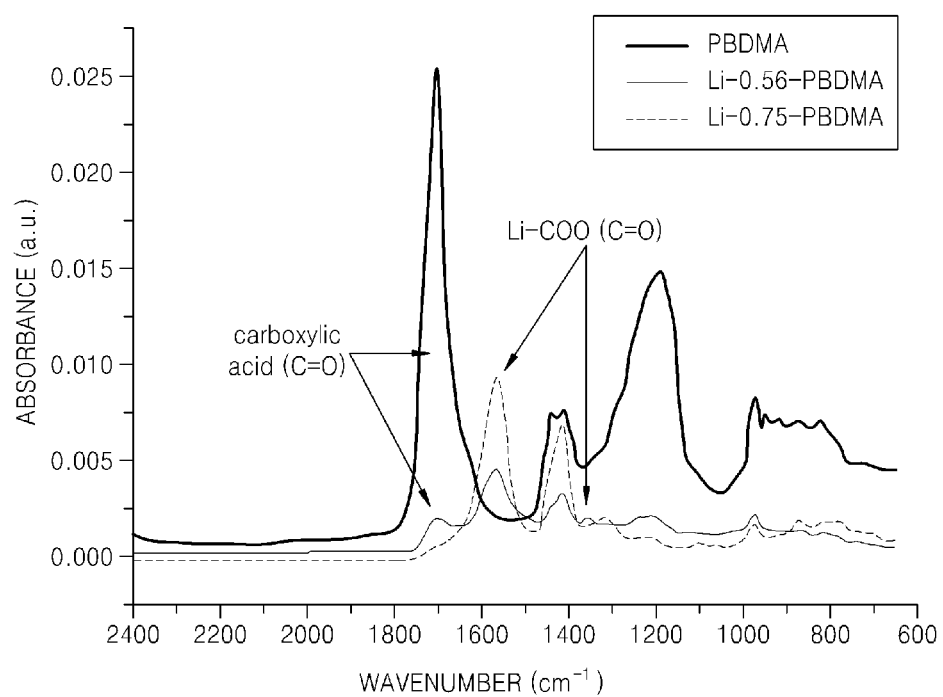
FIG. 3 is a graph of absorbance (arbitrary unit, a.u.) versus wavenumber (reverse centimeter, $cm^{-1}$) illustrating Fourier-Transform Infrared ("FT-IR") spectra of the lithium-substituted poly(butadiene-co-maleic acid) of Preparation Example 1, lithium-substituted poly(butadiene-co-maleic acid) of Preparation Example 2, and poly(butadiene-co-maleic acid) of Comparative Preparation Example 1.

Referring to FIG. 3, in the Li—0.56-PBDMA of Preparation Example 1 and Li-0.75-PBDMA of Preparation Example 2, peaks from —COO—Li form were identified at a wavenumber of 1570 cm$^{-1}$ and 1352 cm$^{-1}$. The higher the degree of substitution of lithium, the smaller the C═O peak of carboxyl acid became.

Evaluation Example 3

ICP-AES Analysis

Water was removed from each of the lithium-substituted poly(butadiene-co-maleic acid)-including compositions of Preparation Examples 1 to 3 to obtain lithium-substituted poly(butadiene-co-maleic acid in solid form, which was then analyzed by inductively coupled plasma atomic emission spectrometry ("ICP-AES"). The results are shown in Table 2.

TABLE 2

| Example | Binder | Amount of Li (wt %) |
|---|---|---|
| Preparation Example 1 | Li-0.56-PBDMA | 3.8 |
| Preparation Example 2 | Li-0.75-PBDMA | 5.5 |
| Preparation Example 3 | Li-1.0-PBDMA | 6.5 |

Evaluation Example 4

Charge/Discharge Characteristics Evaluation

The coin cells of Examples 1-3 and Comparative Example 1 were charged and discharged under the following conditions. Charging was performed at a constant current of about 55 mA per 1 g of the active material to a voltage of about 0.01 V and then at a constant voltage to about 11 milliamperes per gram ("mA/g"). Discharging was performed at a constant current of about 55 mA/g to about 1.5 V.

Changes in voltage with respect to specific capacity in the coin cells of Examples 1 to 3 and Comparative Example 1 were measured. The results are shown in FIG. 4.

Figure 4:
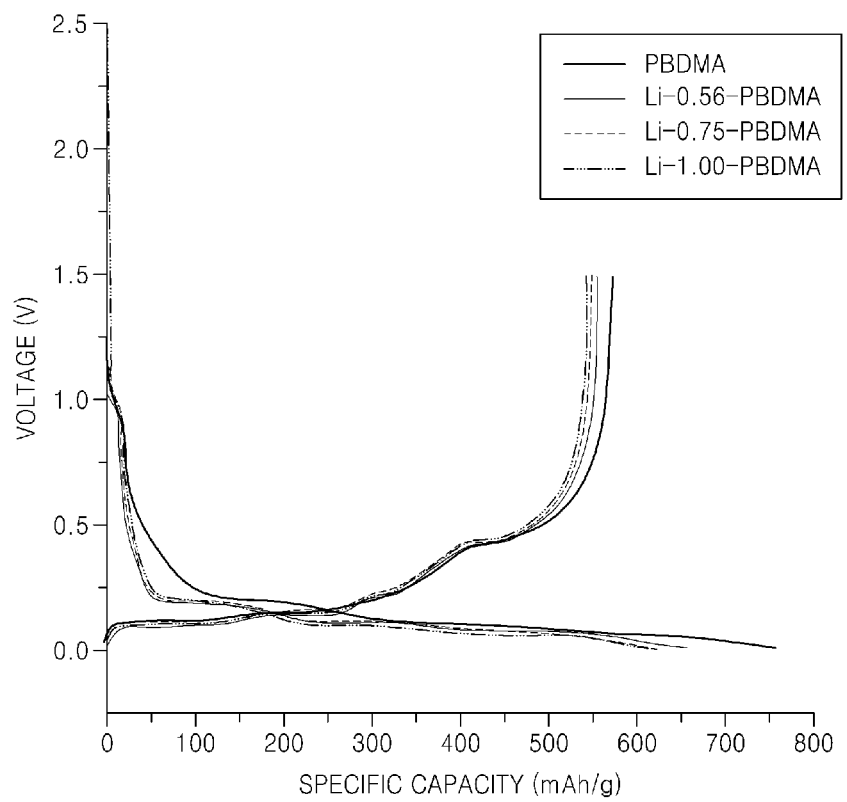
FIG. 4 is a graph of voltage (volt, v) versus specific capacity (milliampere·hour per gram, mAh/g) in coin cells of Examples 1 to 3 and Comparative Example 1.

Referring to FIG. 4, in the coin cells of Examples 1 to 3, a side reaction between the electrode active material and the electrolytic solution is found to be reduced at a voltage of about 0.8 V or less, as compared to the coin cell of Comparative Example 1.

To evaluate capacity retention characteristics, each of the coin cells was repeatedly charged and discharged 100 times under the following conditions. Charging was performed at a constant current of about 275 mA per 1 g of the active material to a voltage of about 0.01 V and then at a constant voltage to about 27.5 mA/g. Discharging was performed at a constant current of about 275 mA/g per 1 g of the active material to about 1.5 V.

Charge/discharge characteristics of the coin cells were evaluated in the following manner, in terms of initial efficiency and capacity retention rate. An initial efficiency and a capacity retention rate of each of the coin cells were calculated using Equations 1 and 2, respectively.

Initial Efficiency (%)=(Discharge Capacity/Charge Capacity)×100      Equation 1

Capacity retention rate (%)=(Discharge Capacity after $100^{th}$ cycle)/(Discharge Capacity after $1^{st}$ cycle)×100      Equation 2

Figure 5:
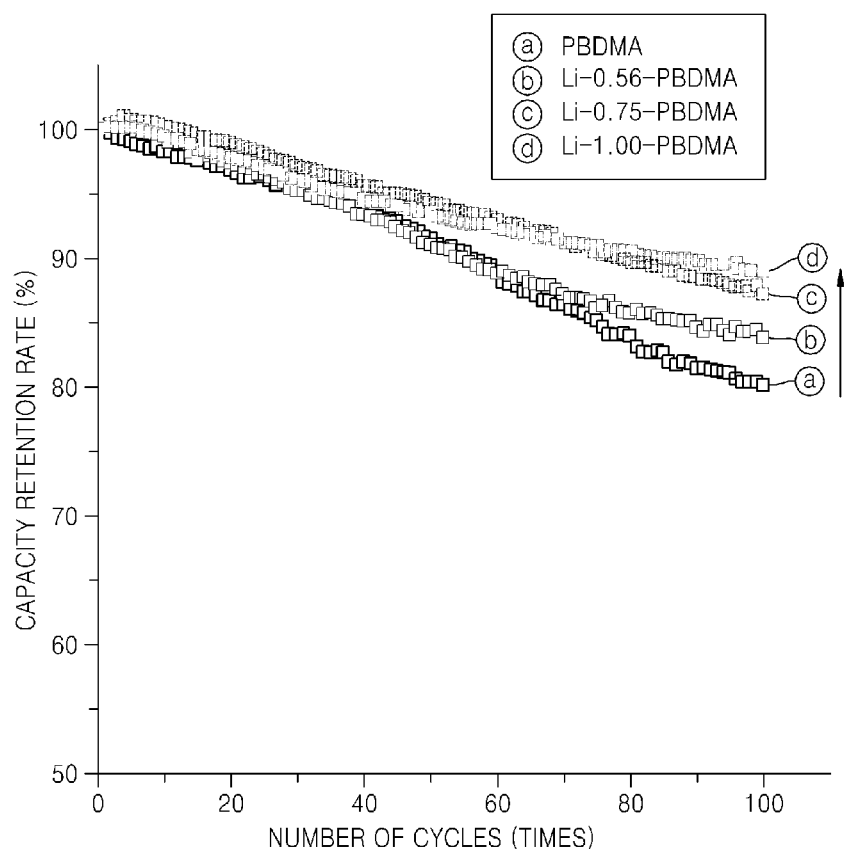
FIG. 5 is a graph of capacity retention rate (percent, %) versus cycle number in the coin cells of Examples 1 to 3 and Comparative Example 1.

$1^{st}$-cycle discharge and charge capacities, initial efficiencies, and capacity retention rates of the coin cells of Example 1-3 and Comparative Example 1 are shown in Table 3. FIG. 5 is a graph illustrating capacity retention rate characteristics with respect to cycle number in the coin cells.

TABLE 3

| Example | Binder | 1st-cycle Charge Capacity (mAh/g) | 1st-cycle Discharge Capacity (mAh/g) | Initial Efficiency (%) | Capacity Retention Rate (%) |
|---|---|---|---|---|---|
| Example 1 | Li-0.56-PBDMA | 656 | 552 | 84.1 | 83.8 |
| Example 2 | Li-0.72-PIBMA | 620 | 548 | 88.3 | 87.3 |
| Example 3 | Li-1.0-PBDMA | 610 | 542 | 88.8 | 90.9 |
| Comparative Example 1 | PBDMA | 755 | 571 | 75.6 | 80.1 |

Referring to Table 3, the coin cells of Examples 1 to 3 were found to have improved initial efficiencies and improved capacity retention rates due to a reduced side reaction between the negative active material and the electrolytic solution, compared to the coin cell of Comparative Example 1.

As described above, according to the one or more of the above embodiments of the present disclosure, an electrode for a lithium battery may include a polymer including a first repeating unit represented by Formula 1 above and a second repeating unit including a substituted or unsubstituted C2-C30 alkenyl group. The polymer may form an artificial solid electrolyte interface ("SEI") film on a surface of an electrode active material to cover defects thereof and prevent direct contact between the electrode active material and an electrolytic solution in a lithium battery, thereby suppressing a side reaction between the electrode active material and the electrolytic solution. A lithium battery including the electrode may have improved initial efficiency and improved energy density.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:
1. A polymer comprising:
a first repeating unit represented by Formula 1 and
a second repeating unit comprising a substituted or unsubstituted C2-C30 alkenyl group, wherein the second repeating unit is a repeating unit represented by Formula 3:

Formula 1 wherein, in Formula 1,
R and R' are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;
A and A' are each independently —C(=O)O—, —OS(=O)$_2$O—, —S(=O)$_2$O—, —S(=O)O—, —OP(=O)O$_2$—, or —P(=O)O$_2$—; and
Y and Y' are each independently a hydrogen atom, an alkali metal, or an ammonium group, provided that Y and Y' are not both hydrogen atoms,

Formula 3 wherein, in Formula 3,
$R_3$ and $R_4$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and
$L_1$ and $L_2$ are each independently a simple bond, a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C6-C30 aryloxy group, a substituted or unsubstituted C7-C30 arylalkylene group, a substituted or unsubstituted C2-C30 heteroarylene group, a substituted or unsubstituted C2-C30 heteroaryloxy group, a substituted or unsubstituted C3-C30 heteroarylalkylene group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkylene group.

2. The polymer of claim 1, wherein the first repeating unit of Formula 1 is a first repeating unit represented by Formula 2:

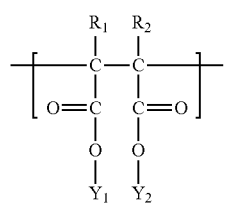

Formula 2 wherein, in Formula 2, $R_1$ and $R_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and $Y_1$ and $Y_2$ are each independently a hydrogen atom, an alkali metal, or ammonium group, provided that $Y_1$ and $Y_2$ are not both hydrogen atoms.

3. The polymer of claim 1, wherein the alkali metal is Li, Na, or K, and the ammonium group is $NH_4$.

4. The polymer of claim 1, further comprising a third repeating unit represented by Formula 4a or 4b:

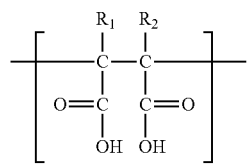

Formula 4a

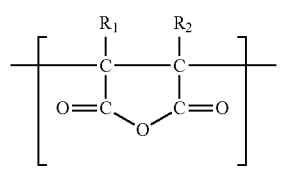

Formula 4b wherein, in Formulae 4a and 4b, $R_1$ and $R_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

5. The polymer of claim 1, further comprising a third repeating unit represented by Formula 4c or 4d, wherein the first repeating unit of Formula 1 of the polymer is a first repeating unit represented by Formula 5, the second repeating unit of the polymer is a second repeating unit represented by Formula 6, and the polymer has a degree of polymerization of about 50 to about 50,000:

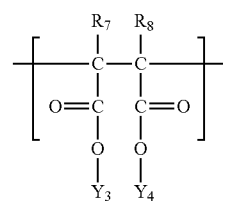

Formula 5 wherein, in Formula 5, $R_7$ and $R_8$ are each independently a hydrogen atom or a C1-C10 alkyl group; and $Y_3$ and $Y_4$ are each independently a hydrogen atom, Li, Na, K, or $NH_4$, provided that $Y_3$ and $Y_4$ are not both hydrogen atoms,

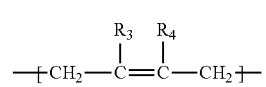

Formula 6 wherein, in Formula 6, $R_3$ and $R_4$ are each independently a hydrogen atom or a C1-C10 alkyl group,

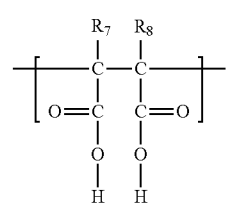

Formula 4c wherein, in Formula 4c,
R$_7$ and R$_8$ are each independently a hydrogen atom or a C1-C10 alkyl group, and

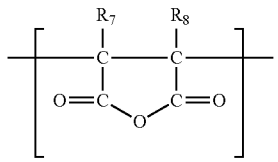

Formula 4d wherein, in Formula 4d,
R$_7$ and R$_8$ are each independently a hydrogen atom or a C1-C10 alkyl group.

6. The polymer of claim 1, further comprising a third repeating unit represented by Formula 4e, wherein the first repeating unit of Formula 1 of the polymer is a first repeating unit represented by Formula 6a, the second repeating unit of the polymer is a second repeating unit represented by Formula 7a, and the polymer has a degree of polymerization of about 50 to about 50,000:

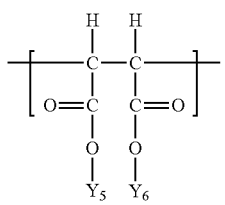

Formula 6a wherein, in Formula 6a,
Y$_5$ and Y$_6$ are each independently a hydrogen atom, Li, Na, K, or NH$_4$, provided that Y$_5$ and Y$_6$ are not both hydrogen atoms,

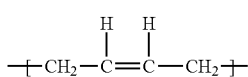

Formula 7a

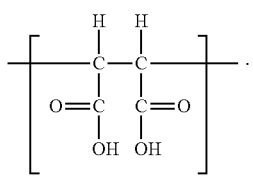

Formula 4e

7. The polymer of claim 1, wherein the polymer is a compound represented by Formula 8:

wherein, in Formula 8,
i) Y$_5$ and Y$_6$ are both lithium, or
ii) one of Y$_5$ and Y$_6$ is lithium and the other one of Y$_5$ and Y$_6$ is a hydrogen atom;
a is a mole fraction of 0 or from about 0.01 to about 0.99, and
b is a mole fraction of about 1 or from about 0.01 to about 0.99,
wherein a+b=1; and
m and n are each a mole fraction from about 0.01 to about, where m+n=1.

8. The polymer of claim 7, wherein, in Formula 8,
a is 0,
b is 1, and
Y$_5$ and Y$_6$ are both lithium.

9. The polymer of claim 1, wherein a degree of substitution of the alkali metal or the ammonium group in the polymer is from about 0.2 to about 1.0.

10. The polymer of claim 1, wherein a peak from carbon of —COOLi in $^{13}$C nuclear magnetic resonance spectra of the polymer has a chemical shift range from about 180 ppm (parts per million) to about 185 ppm (parts per million), and a peak having maximum intensity from the carbon has a chemical shift of about 185 ppm (parts per million).

11. The polymer of claim 1, wherein the polymer has a weight average molecular weight of from about 10,000 Daltons to about 500,000 Daltons.

12. The polymer of claim 1, wherein an amount of lithium in the polymer is from about 2 percent by weight to about 15 percent by weight.

13. A cross-linked polymer comprising a cross-linking reaction product of the polymer of claim 1.

14. An electrode for a lithium battery, the electrode comprising:
at least one of the polymer of claim 1 and a cross-linking reaction product of the polymer; and
an electrode active material.

15. The electrode of claim 14, wherein an amount of the at least one of the polymer and the cross-linking reaction product of the polymer is from about 1 part by weight to about 30 parts by weight based on 100 parts by weight of the electrode active material.

16. A lithium battery comprising the electrode of claim 14.

17. A polymer as a reaction product of:
a polymer A comprising a first repeating unit represented by Formula 4c or 4d and a second repeating unit comprising a substituted or unsubstituted C2-C30 alkenyl group; and
a base comprising an alkali metal or an ammonium group, wherein the second repeating unit is a repeating unit represented by Formula 3:

Formula 8

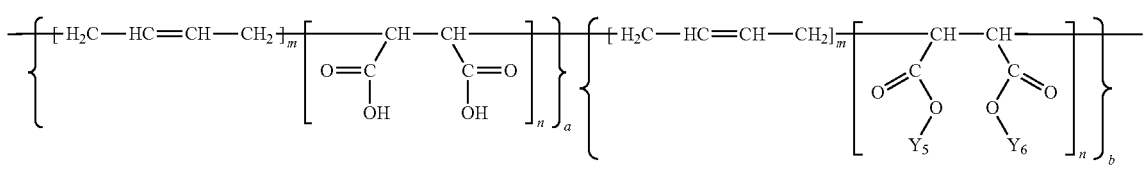

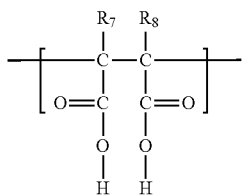

Formula 4c wherein, in Formula 4c,
$R_7$ and $R_8$ are each independently a hydrogen atom or a C1-C10 alkyl group,

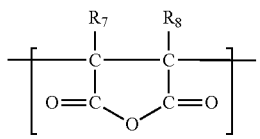

Formula 4d wherein, in Formula 4d,
$R_7$ and $R_8$ are each independently a hydrogen atom or a C1-C10 alkyl group,

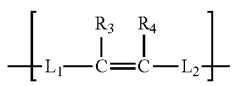

Formula 3 wherein, in Formula 3,
$R_3$ and $R_4$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and $L_1$ and $L_2$ are each independently a simple bond, a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C6-C30 aryloxy group, a substituted or unsubstituted C7-C30 arylalkylene group, a substituted or unsubstituted C2-C30 heteroarylene group, a substituted or unsubstituted C2-C30 heteroaryloxy group, a substituted or unsubstituted C3-C30 heteroarylalkylene group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkylene group.

18. The polymer of claim 17, wherein the second repeating unit is a repeating unit represented by Formula 3:

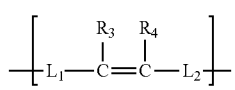

Formula 3 wherein, in Formula 3,
$R_3$ and $R_4$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and $L_1$ and $L_2$ are each independently a simple bond, a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C6-C30 aryloxy group, a substituted or unsubstituted C7-C30 arylalkylene group, a substituted or unsubstituted C2-C30 heteroarylene group, a substituted or unsubstituted C2-C30 heteroaryloxy group, a substituted or unsubstituted C3-C30 heteroarylalkylene group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkylene group.

19. The polymer of claim 17, wherein the base comprising an alkali metal is at least one selected from lithium hydroxide, sodium hydroxide, and potassium hydroxide, and the base comprising an ammonium group is ammonium hydroxide.

20. The polymer of claim 17, wherein the reaction product is a product of reaction at about 20° C. to about 100° C. of a mixture of the polymer comprising the first repeating unit represented by Formula 4c or 4d and the second repeating unit comprising the substituted or unsubstituted C2-C30 alkenyl group, the base comprising an alkali metal or an ammonium group, and water.

\* \* \* \* \*